United States Patent
Hyo

(10) Patent No.: US 8,363,238 B2
(45) Date of Patent: Jan. 29, 2013

(54) IMAGE FORMING APPARATUS HAVING A MANAGEMENT UNIT AND A SHARED PROCESSING UNIT, INFORMATION PROCESSING METHOD USING THE IMAGE FORMING APPARATUS, AND IMAGE FORMING SYSTEM HAVING THE IMAGE FORMING APPARATUS

(75) Inventor: Kiyohiro Hyo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 701 days.

(21) Appl. No.: 12/492,175

(22) Filed: Jun. 26, 2009

(65) Prior Publication Data

US 2010/0002254 A1 Jan. 7, 2010

(30) Foreign Application Priority Data

Jul. 7, 2008 (JP) .................................. 2008-177332

(51) Int. Cl.
*G06F 3/12* (2006.01)

(52) U.S. Cl. ...................... 358/1.13; 358/1.14; 358/1.15; 358/1.16; 715/234; 715/762; 709/217

(58) Field of Classification Search ................. 358/1.13, 358/1.14, 1.15; 715/234, 762; 709/217
See application file for complete search history.

(56) References Cited

U.S. PATENT DOCUMENTS

| 7,426,733 | B2 | 9/2008 | Otake | |
|---|---|---|---|---|
| 2006/0077414 | A1* | 4/2006 | Lum et al. | 358/1.13 |
| 2006/0077454 | A1* | 4/2006 | Lum et al. | 358/1.15 |
| 2009/0063612 | A1 | 3/2009 | Hyo | |

FOREIGN PATENT DOCUMENTS

| JP | 2004-272317 | 9/2004 |
|---|---|---|
| JP | 2005-055983 | 3/2005 |
| JP | 2006-072910 | 3/2006 |
| JP | 2009-113390 | 5/2009 |

OTHER PUBLICATIONS

Extended European Search Report.
Pautasso C et al: "RESTful web services vs. "Big" web services : Making the right architectural decision", Apr. 2008, pp. 805-814.
Bathelt M et al: "Accessing embedded systems via WWW: the ProWeb toolset", Sep. 1, 1997, pp. 1065-1073.

* cited by examiner

*Primary Examiner* — Jacky X Zheng
(74) *Attorney, Agent, or Firm* — IPUSA, PLLC

(57) ABSTRACT

An image forming apparatus includes a shared processing unit configured to define processes used in common by a plurality of function implementing units, and a management unit configured to store in memory a logic name and identification information identifying a function implementing unit for each of the plurality of function implementing units such that the logic name and the identification information are associated with each other, and to generate a logic unit based on a logic name associated with given identification information contained in a request if the given identification information contained in the request is stored in the memory, the logic unit serving to cause a function implementing unit identified by the given identification information to perform processing, wherein the shared processing unit is configured to request the logic unit generated by the management unit to process a requested item contained in the request.

11 Claims, 29 Drawing Sheets

FIG.6

```
POST /addressBook/member HTTP/1.1          HTTP REQUEST HEADER         R1
Host: sample.com
Content-Type: application/atom+xml <?xml version="1.0" ?>                                  ~e
<entry xmlns="http://www.w3.org/2005/Atom"              Atom+ EXTENSION FORMAT    R2
   xmlns:a="http://sample.com/addressBook"
   xmlns:vendor=http://ws.vendor.co.jp/addressBook>    ~f
<title>foo</title>
<id>sample-id</id>
                                                        EXTENSION FORMAT    R3
<a:user>
   <a:name>foo</a:name>
   <a:email>foo@sample.co.jp</a:email>
</a:user>
<a:Tag1>m</a:Tag1>
<a:faxAddress>***********</a:faxAddress>
<a:faxNumber>***********</a:faxNumber>
<vendor:deliverDestination>***********</vendor:deliverDestination>  ⎫
<vendor:deliver***>***********</vendor:deliver***>                  ⎬ g
</entry>
```

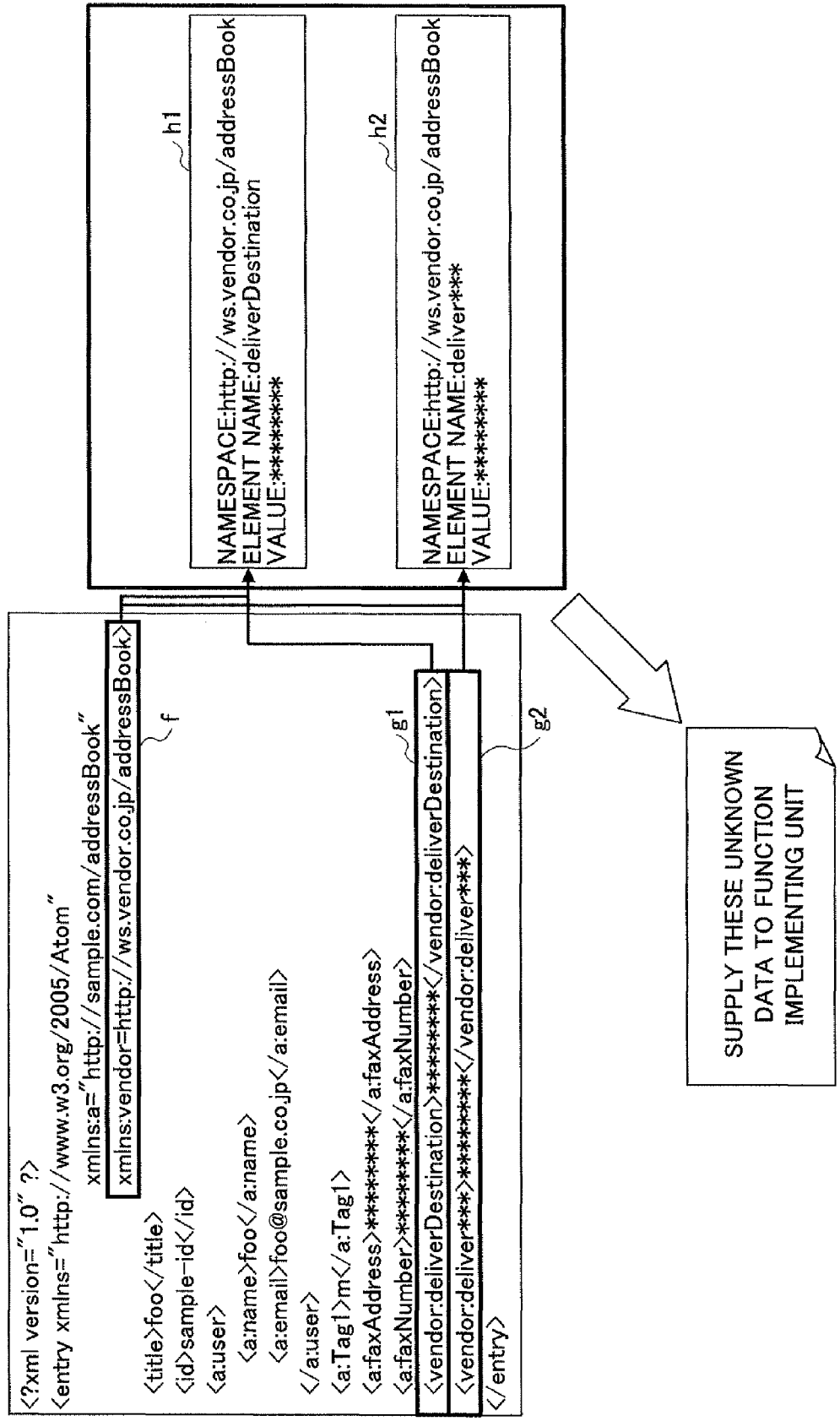

FIG.10

```
HTTP/1.1 201 Created
Date: Fri, 21 Feb 2007 18:30:03 GMT
Content-Length: nnn
Content-Type: application/atom+xml; charset="utf-8"
Location: http://sample.com/addressbook/member/007

<?xml version="1.0" ?>
<entry xmlns="http://www.w3.org/2005/Atom"
          xmlns:a="http://sample.com/addressBook"
          xmlns:vendor=http://ws.vendor.co.jp/addressBook>
  <title>foo</title>
  <link href="http://sample.com/addressBook/member/007"/>
  <id>sample-007</id>
  <updated>2007-02-21T18:30:02Z</updated>
  <a:entryID>007</a:entryID>
  <a:user>
      <a:name>foo</a:name>
      <a:email>foo@sample.co.jp</a:email>
  </a:user>
  <a:Tag1>m</a:Tag1>
  <a:faxAddress>********</a:faxAddress>
  <a:faxNumber>********</a:faxNumber>
  <vendor:deliverDestination>********</vendor:deliverDestination>   ⎫
  <vendor:deliver***>********</vendor:deliver***>                   ⎬ u1
</entry>                                                            ⎭
```

FIG.11

HTTP/1.1 201 Created
Date: Fri, 21 Feb 2007 18:30:03 GMT
Content-Length: nnn
Content-Type: application/atom+xml; charset="utf-8"
Location: http://sample.com/addressbook/member/007

```
<?xml version="1.0" ?>
<entry xmlns:a="http://www.w3.org/2005/Atom"
       xmlns:a="http://sample.com/addressBook"
       xmlns:vendor=http://ws.vendor.co.jp/addressBook>
<title>foo</title>
<link href="http://sample.com/addressBook/member/007"/>
<id>sample-007</id>
<updated>2007-02-21T18:30:02Z</updated>
<a:entryID>007</a:entryID>
<a:user>
  <a:name>foo</a:name>
  <a:email>foo@sample.co.jp</a:email>
</a:user>
<a:Tag1>m</a:Tag1>
<vendor:deliverDestination>******</vendor:deliverDestination>
<vendor:deliver***>******</vendor:deliver***>
</entry>
```

DATA SHOWN BELOW IS NOT YET PROCESSED
<a:faxAddress>*******</a:faxAddress>
<a:faxNumber>*******</a:faxNumber>

FIG.15

| IDENTIFIER 1 | LOGIC_NAME 1 |
|---|---|
| IDENTIFIER 2 | LOGIC_NAME 2 |
| IDENTIFIER 3 | LOGIC_NAME 3 |
| ⋮ | ⋮ |

FIG.23

```
<ad:user>
    <ad:name>hoge</ad:name>
    <ad:email>hoge@sample.co.jp</ad:email>
</ad:user>
<ad:tag>H</ad:tag>
<ad:fax>0123456789</ad:fax>
※ad : NAMESPACE OF ADDRESS BOOK DATA
```

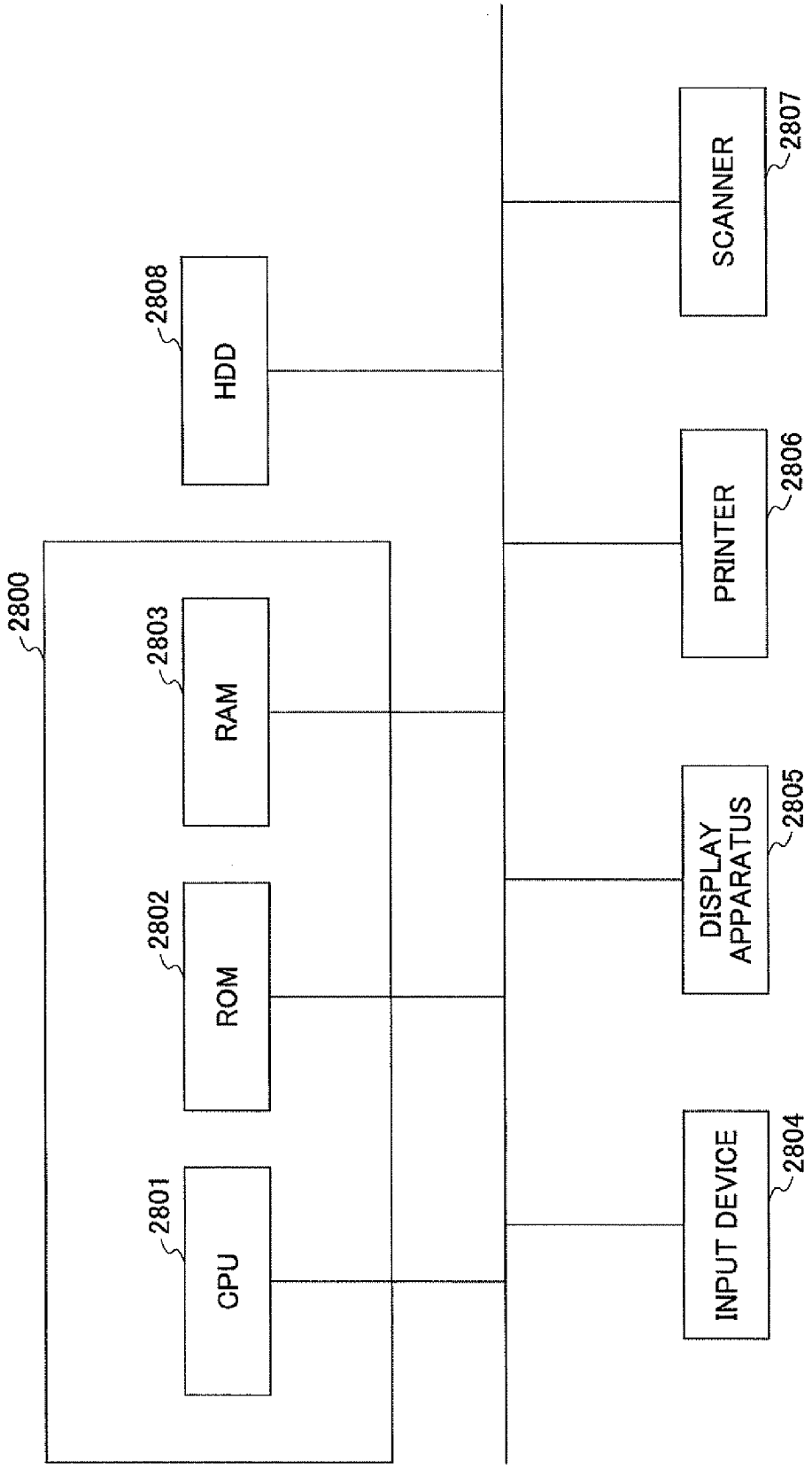

IMAGE FORMING APPARATUS HAVING A MANAGEMENT UNIT AND A SHARED PROCESSING UNIT, INFORMATION PROCESSING METHOD USING THE IMAGE FORMING APPARATUS, AND IMAGE FORMING SYSTEM HAVING THE IMAGE FORMING APPARATUS

BACKGROUND OF THE INVENTION

1. Field of the Invention

The disclosures herein generally relate to an image forming apparatus, an information processing method, and an image forming system.

2. Description of the Related Art

When a function is added as a functional extension of an image forming apparatus (e.g., MFP: multifunction peripheral), it may be preferable to arrange that the added function is usable as a Web service. To this end, there may be a need to create a WSDL (Web Services Description Language) for the newly added function and to provide an I/F (i.e., interface) to clients through the created WSDL. In such a case, there may be a need for a client to perform the following steps: 1) finding a WSDL corresponding to the new function; 2) creating client-side codes corresponding to the I/F embedded in the WSDL; and 3) coping with the actions defined in the new Web service. With regard to each of these steps, proposals have been made as described below.

With respect to the first step of "finding a WSDL corresponding to the new function", an external server for managing the WSDL may be provided, and the WSDL may be registered in this server in advance. This external server may be implemented by use of a conventional technology referred to as UDDI (Universal Description, Discovery, and Integration). Japanese Laid-open Patent Publication No. 2005-055983 discloses a method that solves a query by providing a separate service management apparatus.

With respect to the second step of "creating client-side codes corresponding to the I/F embedded in the WSDL", various methods have been disclosed. Japanese Laid-open Patent Publication No. 2004-272317 discloses a client that dynamically copes with a change made to the I/F on the server side. In this arrangement, the client detects an error upon accessing an I/F that has been changed, and executes an error circumventing program if the detected error is caused by a change made to the I/F. Further, Japanese Laid-open Patent Publication No. 2005-055983 discloses providing an intermediary apparatus for managing Web services. A service provider registers in this intermediary apparatus in advance. A user then accesses the intermediary apparatus which absorbs a difference in the I/F from that of the provider.

With respect to the third step of "coping with the actions defined in the new Web service", Japanese Laid-open Patent Publication No. 2006-072910 discloses registering a scenario in an external server in advance wherein this scenario defines actions for using a Web service. When using the Web service, the scenario is obtained from the server to access the Web service.

In the technology disclosed in Japanese Laid-open Patent Publication No. 2005-055983, there is a need for an external apparatus for managing a WSDL. In order to use a new function as a Web service, a client needs to obtain the WSDL from such an external apparatus. In the technology disclosed in Japanese Laid-open Patent Publication No. 2004-272317, there is a need to provide embedded programs for error detection and error circumvention. Further, code compilation is necessary when preparation is made on the client side. In the technology disclosed in Japanese Laid-open Patent Publication No. 2006-072910, there is a need to provide an external server in advance, in which scenarios need to be registered.

Accordingly, it may be preferable to provide an image forming apparatus, an information processing method, and an image forming system that can dynamically extend a Web service function through the use of a unified I/F.

SUMMARY OF THE INVENTION

In one embodiment, an image forming apparatus includes: a communication unit configured to receive a request written in a first description format; a data processing unit configured to convert a requested item contained in the request into a data format of processing details corresponding to the requested item if the data format is available, and configured to convert the requested item into a second description format if the data format is not available; a management unit configured to store in memory a logic name and identification information identifying a function implementing unit for each of a plurality of function implementing units such that the logic name and the identification information are associated with each other; and a shared processing unit configured to define processes used in common by the plurality of function implementing units, wherein the management unit is configured to generate a logic unit based on a logic name associated with given identification information contained in the request if the given identification information contained in the request is stored in the memory, the logic unit serving to cause a function implementing unit identified by the given identification information to perform processing, and wherein the shared processing unit is configured to request the logic unit generated by the management unit to process the requested item contained in the request.

In another embodiment, an information processing method is provided for an image forming apparatus which includes: a communication unit configured to receive a request written in a first description format; a data processing unit configured to convert a requested item contained in the request into a data format of processing details corresponding to the requested item if the data format is available, and configured to convert the requested item into a second description format if the data format is not available; a management unit configured to store in memory a logic name and identification information identifying a function implementing unit for each of a plurality of function implementing units such that the logic name and the identification information are associated with each other; and a shared processing unit configured to define processes used in common by the plurality of function implementing units. The information processing method includes checking, by the management unit, whether given identification information contained in the request for identifying a function implementing unit is found in the memory; generating, by the management unit, a logic unit based on a logic name associated with the given identification information if the given identification information is found in the memory by said checking, the logic unit serving to cause the function implementing unit identified by the given identification information to perform processing; and requesting, by the shared processing unit, the logic unit generated by said generating to process the requested item contained in the request.

In another embodiment, an image forming system in which a client apparatus and an image forming apparatus are connected to each other, the client apparatus comprising: a request generating unit configured to generate a request in a first description format, the request containing a requested item that is requested to the image forming apparatus; and a first communication unit configured to transmit the request, the image forming apparatus comprising: a second communication unit configured to receive a request written in a first description format; a data processing unit configured to convert a requested item contained in the request into a data format of processing details corresponding to the requested item if the data format is available, and configured to convert the requested item into a second description format if the data format is not available; a management unit configured to store in memory a logic name and identification information identifying a function implementing unit for each of a plurality of function implementing units such that the logic name and the identification information are associated with each other; and a shared processing unit configured to define processes used in common by the plurality of function implementing units, wherein the management unit is configured to generate a logic unit based on a logic name associated with given identification information contained in the request if the given identification information contained in the request is stored in the memory, the logic unit serving to cause a function implementing unit identified by the given identification information to perform processing, and wherein the shared processing unit is configured to request the logic unit generated by the management unit to process the requested item contained in the request.

According to at least one embodiment of the present invention, an image forming apparatus, an information processing method, and an image forming system that can dynamically extend a Web service function through the use of a unified I/F are provided.

BRIEF DESCRIPTION OF THE DRAWINGS

Other objects and further features of embodiments will be apparent from the following detailed description when read in conjunction with the accompanying drawings, in which:

FIG. 6 is a drawing illustrating an example of a request;

FIG. 7 is a drawing illustrating an example of conversion of a requested item into a second description format;

FIG. 10 is a drawing illustrating an example of a response;

FIG. 11 is a drawing illustrating an example of a response;

FIG. 15 is a drawing illustrating an example of a management table stored in memory;

FIG. 23 is a drawing illustrating an example of data retained in an address book extension data unit;

FIG. 29 is a drawing illustrating the configuration of a computer implementing an MFP or a client PC according to the present embodiment.

DESCRIPTION OF THE PREFERRED EMBODIMENTS

In the following, embodiments of the present invention will be described with reference to the accompanying drawings.
<Schematic Configuration of Image Forming System>

Figure 1:
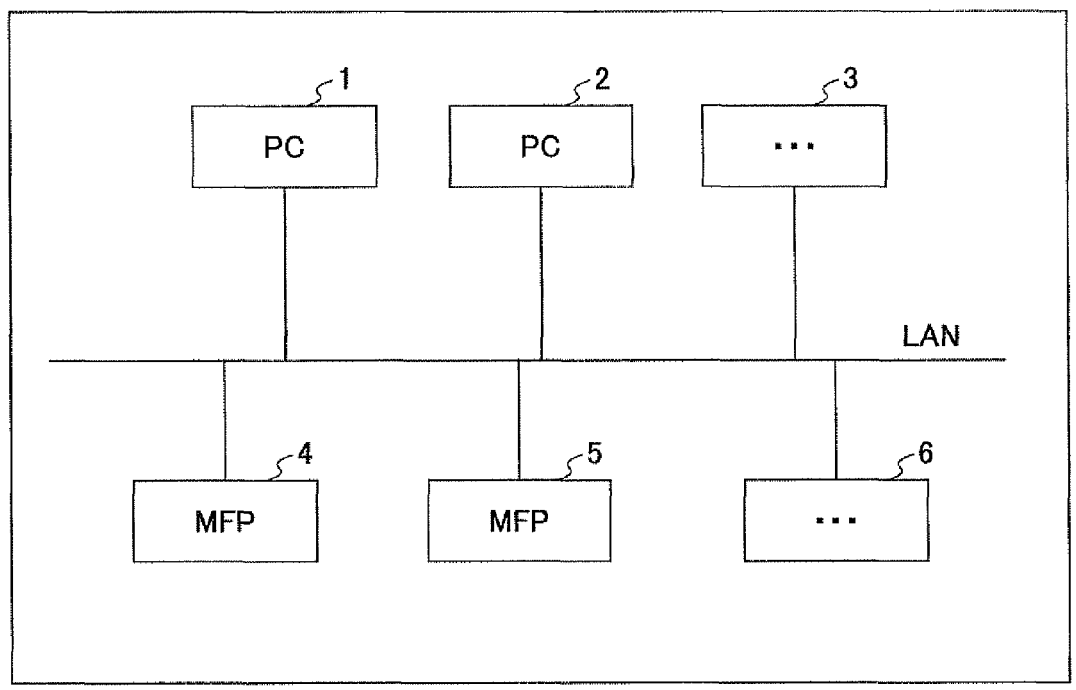
FIG. 1 is a drawing illustrating an example of the schematic configuration of an image forming system according to a present embodiment.

FIG. 1 is a drawing illustrating an example of the schematic configuration of an image forming system according to a present embodiment. The image forming system illustrated in FIG. 5 includes PC1 (i.e., a personal computer which may hereinafter be referred to as a client PC), PC2, PC3, and so on, and an MFP (i.e., image forming apparatus) 4, an MFP 5, an MFP 6, and so on, which are connected to a LAN (Local Area Network) With this arrangement, each PC may send a request to any given MFP, and may receive a response from the MFP.
<Outline of Image Forming System>

Figure 2:
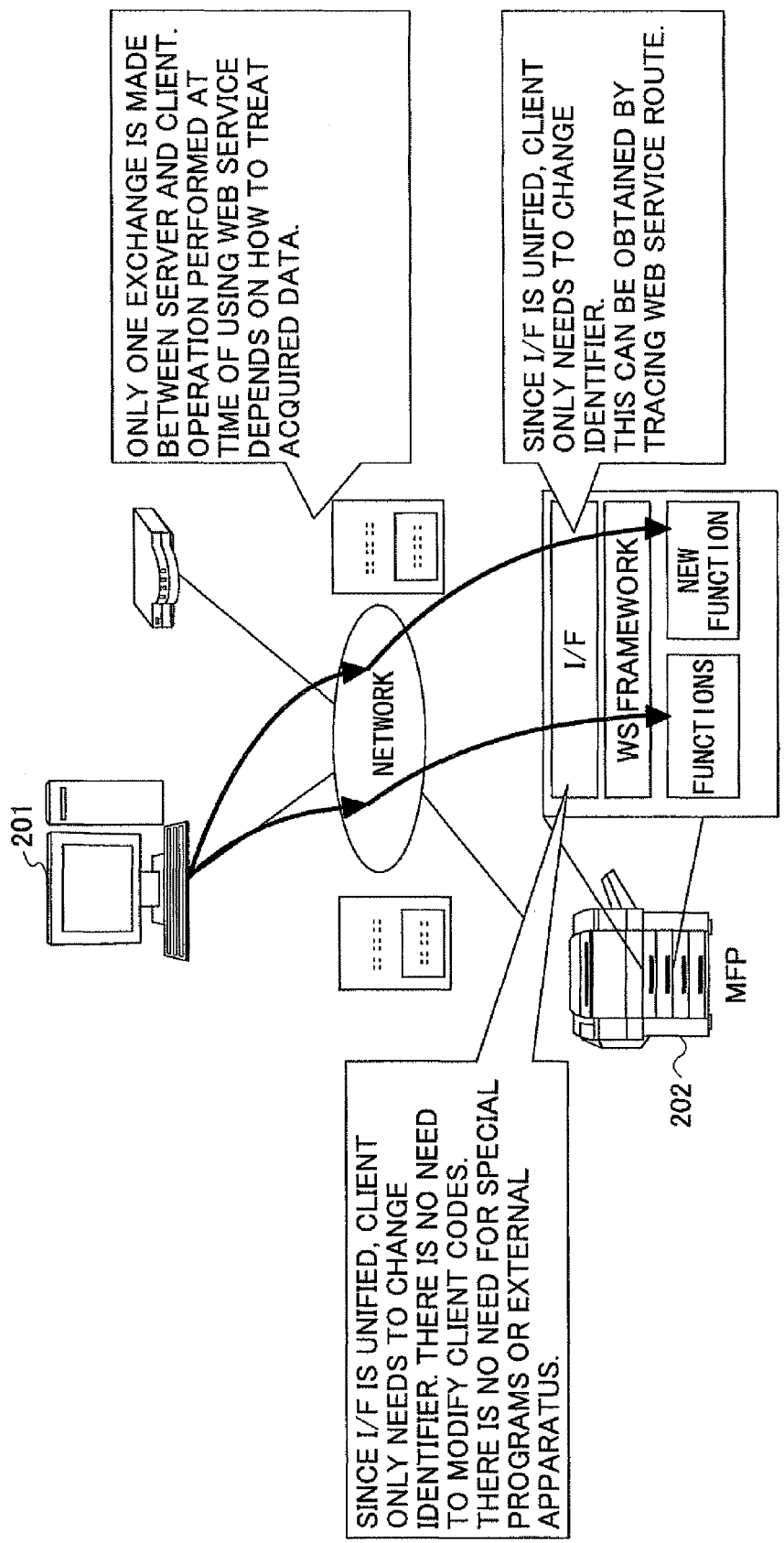
FIG. 2 is a drawing illustrating an outline of the image forming system according to the present embodiment.

FIG. 2 is a drawing illustrating an outline of the image forming system according to the present embodiment. I/F portions are unified in the image forming system according to the present embodiment. There is thus no need to describe an I/F by use of a WSDL at every turn for use by a client PC 201. Despite the use of a unified I/F, there may be a need to specify an identifier at the time of access. What needs to be changed in the client PC 201 is this identifier. There is no need to modify codes for using a Web service. A description will be given later with respect to a framework by which a Web service functional extension can be dynamically performed while using a unified I/F.

In the image forming system according to the present embodiment, all the data inclusive of parameters necessary for making device settings are described in a request or response so that only one exchange between the client PC 201 and a server (MFP) 202 suffices. There is thus no need to perform a procedure that is registered in an external server. As will be described later, the contents of the data are configured such that it is easy to extend functions. At the client PC 201, thus, minimum necessary actions can be performed without the need to make modification upon functional extension. This aspect will be described later in detail.

<Detailed Configuration of Image Forming System>

Figure 3:
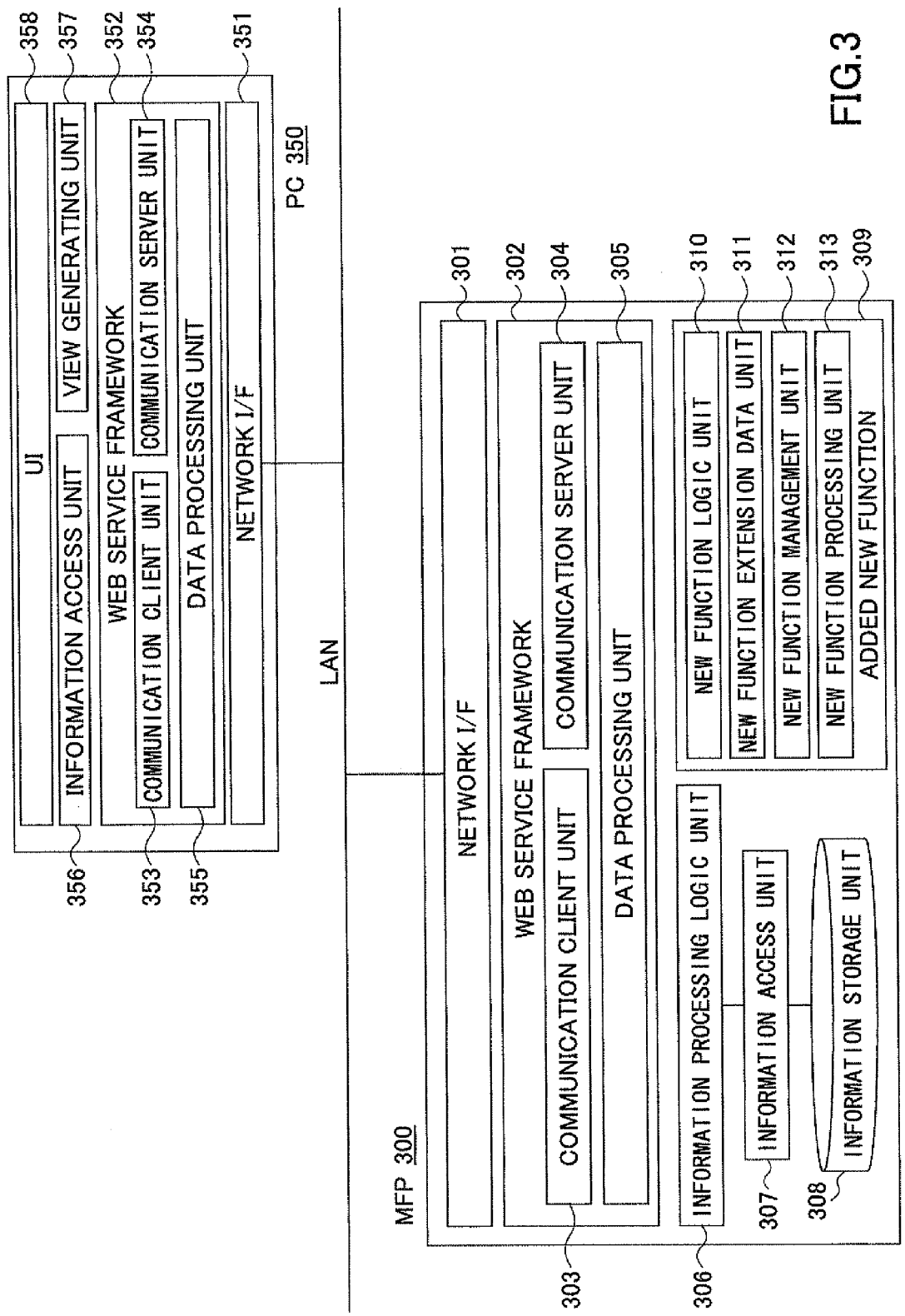
FIG. 3 is a drawing illustrating a detailed configuration of the image forming system according to the present embodiment.

FIG. 3 is a drawing illustrating an example of the detailed configuration of the image forming system. As illustrated in FIG. 3, an MFP 300 and a client PC 350 are connected to each other via a LAN. Alternatively, they may be directly connected. In the following, the MFP 300 will be described first.

The MFP 300 illustrated in FIG. 3 includes a network interface (hereinafter referred to as network I/F) 301, a Web service framework 302, an information processing logic unit 306, an information access unit 307, an information storage unit 308, and a new function 309.

The network I/F 301 is an interface for connecting the image forming apparatus 300 to the LAN. The Web service framework 302 includes a communication client unit 303, a communication server unit 304, and a data processing unit 305.

The communication client unit 303 and the communication server unit 304 are used to communicate with the client PC 350. The data processing unit 305 analyzes a request from the client PC 350, and generates a response to the client PC 350. For example, the data processing unit 305 parses a request described in XML (Extensible Markup Language), and generates a response described in XML. The detail of the data processing unit 305 will later be described.

The information processing logic unit 306 is provided with a logic function that is completed within a device. The information processing logic unit 306 analyzes a request that is completed within a device, and generates a response. The information access unit 307 acquires information retained in the information storage unit 308 based on a requested item contained in a request that is analyzed by the information processing logic unit 306. The information access unit 307 edits the acquired information to generate replacement or updated information for storage in the information storage unit 308. The information storage unit 308 serves to store data indicative of a state of the MFP 300, identification information for each operator, image data, and so on.

The new function 309 includes a new function logic unit 310, a new function extension data unit 311, a new function management unit 312, and a new function processing unit 313. The new function logic unit 310 is generated each time the Web service is requested. The new function logic unit 310 requests the data processing unit 305 to analyze data if the data of a requested item contained in the request needs to be analyzed. If such analysis is unnecessary, the new function logic unit 310 sends a request to process the Web service to the new function processing unit 313.

The new function extension data unit 311 retains data that is extended by the new function 309. The new function management unit 312 supplies a logic name and a URI (Uniform Resource Identifier) serving as an identifier of the new function 309 to a logic management unit 1203 (which will be described later) when the new function 309 is added to the MFP 300. Here, the logic name may be a class name as defined in JAVA (registered trademark). The new function processing unit 313 performs processing of the new function 309. The new function processing unit 313 corresponds to a function implementing unit 405, which will be described later.

In the following, the client PC 350 will be described. The client PC 350 includes a network I/F 351, a Web service framework 352, an information access unit 356, a view generating unit 357, and a user interface (hereinafter referred to as UI) 358. The network I/F 351, the Web service framework 352, and the information access unit 356 perform similar processing to the one performed by the corresponding units of the MFP 300, and a description thereof will be omitted.

The view generating unit 357 generates data of a display screen that is used to display a response from the MFP 300 on a display screen. The UI 358 is a user interface used to operate the client PC 350. In the following, the data processing units 305 and 355 for unifying an I/F will be described.

<Unified I/F>

In the present embodiment, the I/F is unified. The data processing units 305 and 355 serve to achieve such I/F unification. In the following, a description will be given of the main functions of the MFP and PC inclusive of the data processing units 305 and 355.

Figure 4:
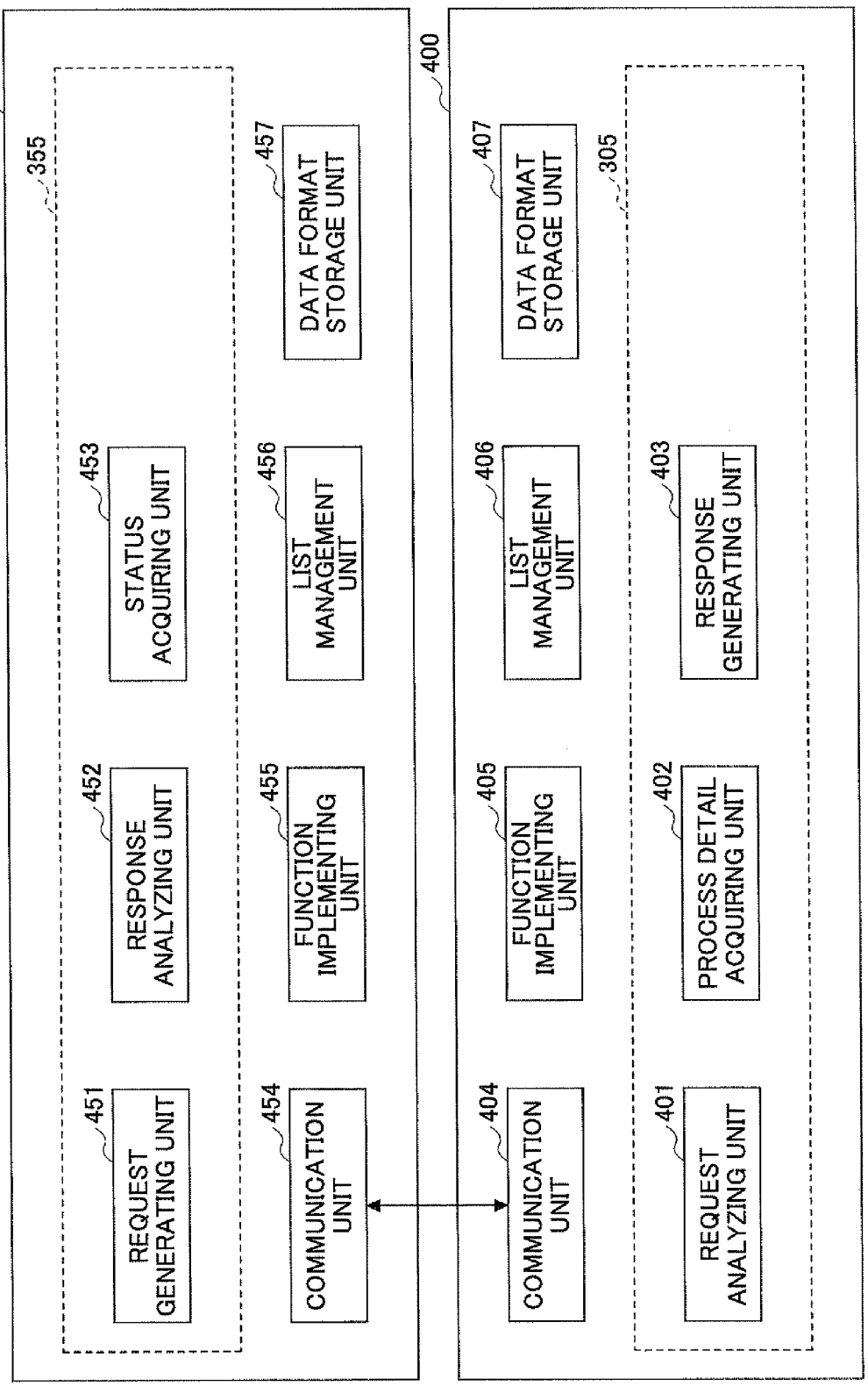
FIG. 4 is a drawing illustrating an example of a main functional configuration of an MFP and a PC according to the present embodiment.

FIG. 4 is a drawing illustrating an example of the main functional configuration of an MFP 400 and a client PC 450 for use in I/F unification. As illustrated in FIG. 4, the MFP 400 includes the data processing unit 305, the function implementing unit 405, a list management unit 406, a data format storage unit 407, and a communication unit 404. The data processing unit 305 analyzes a request from the client PC 450 to acquire a requested item contained in the request. The data processing unit 305 also generates a response corresponding to the requested item.

The data processing unit 305 may include a request analyzing unit 401, a process detail acquiring unit 402, and a response generating unit 403. The request analyzing unit 401 analyzes a request described in a first description format. This analysis is performed according to the syntax of the first description format. The first description format may be a description format that is written in XML and for which a set of items is identified by a namespace. The request analyzing unit 401 may be implemented as an XML parser. With this arrangement, a requested item contained in a request can be acquired.

The process detail acquiring unit 402 acquires identification information identifying the function implementing unit 405 and processing details corresponding to the requested item based on the results of analysis obtained by the request analyzing unit 401. Based on a data format specified for each function implementing unit stored in the data format storage unit 407, for example, the process detail acquiring unit 402 converts the requested item into the processing details represented in the corresponding data format.

If the data format corresponding to the requested item cannot be acquired, the process detail acquiring unit 402 converts the requested item into a predetermined description format. The predetermined description format may be a second description format, which may be comprised of a namespace name, a variable or tag name, and a class having a value.

The case in which the data format cannot be acquired may occur when a data format serving as a data interface for the function implementing unit 405 is not registered in the data format storage unit 407 despite the fact that the identification information is stored in the list management unit 406 because the function implementing unit 405 corresponding to the requested item is a newly added one.

With the above-described arrangement, it is possible to issue a request and to request processing with respect to a function implementing unit 405 newly added to the MFP 400.

The response generating unit 403 generates a response corresponding to the requested item processed by the function implementing unit 405. The response generated by the response generating unit 403 may depend on a version in which the MFP 400 belongs, for example. The response generated by the response generating unit 403 includes a response item output from the function implementing unit 405.

The response generating unit 403 converts a response item output from the function implementing unit 405 described in a function-implementing-unit-specific data format into a response described in the first description format. If the response item output from the function implementing unit 405 is written in the second description format, the response generating unit 403 extracts necessary information from this response item for inclusion in the response described in the first description format.

The case in which the response item is written in the second description format may occur when a data format serving as a data interface for the function implementing unit 405 is not registered in the data format storage unit 407 despite the fact that the identification information is stored in the list management unit 406 because the function implementing unit 405 is a subsequently added one.

With the above-described arrangement, it is possible to generate a response corresponding to the response item output from the function implementing unit 405 that is newly added to the MFP 400.

The function implementing unit 405 performs corresponding processing based on the requested item acquired by the process detail acquiring unit 402. The function implementing unit 405 may acquire information stored in memory (not shown) to output the acquired information. The function implementing unit 405 may edit information stored in the memory to replace the information, or may generate new information based on the requested item for storage in the memory. The memory may further store information relating to a state of the MFP 400, image data of images processed by the MFP 400, information regarding operators using the MFP 400, etc.

The function implementing unit 405 may perform processing relating to the image forming function, communication function, facsimile function, and so on of the MFP 400 in addition to processing relating to the information stored in the memory. The function implementing unit 405 may be part of the MFP 400, or may be connected to the MFP 400.

The list management unit 406 stores and manages a list of function implementing units 405 provided in the MFP 400. When a new function implementing unit 405 is added, the list managed by the list management unit 406 is updated.

The data format storage unit 407 stores data formats for requested items, response items, and/or state items separately for each function implementing unit. With this provision, the process detail acquiring unit 402 or the like can perform conversion between the first description format and a data format corresponding to a given function implementing unit.

The communication unit 404 communicates with the client PC 450 to receive a request and transmit a response and/or message, for example.

The client PC 450 sends a request to the MFP 400, and receives a response from the MFP 400 responding to the request. In this manner, the client PC 450 controls the MFP 400, and manages information kept at the MFP 400.

The client PC 450 may include a data processing unit 355, a communication unit 454, a function implementing unit 455, a list management unit 456, and a data format storage unit 457. The data processing unit 355 generates a request for transmission to the MFP 400, and analyzes a response transmitted from the MFP 400. This makes it possible to acquire the status of the MFP 400. The status may be a state of the MFP 400, and/or may be information stored in the MFP 400.

The data processing unit 355 may include a request generating unit 451, a response analyzing unit 452, and a status acquiring unit 453. The request generating unit 451 generates a request including a requested item that is requested to the MFP 400. The request generated by the request generating unit 451 may be described in the first description format.

The response analyzing unit 452 analyzes a response transmitted from the MFP 400. The response analyzing unit 452 may be implemented as an XML parser if a response is described in XML, for example.

The status acquiring unit 453 acquires the status of the MFP 400 based on a response item analyzed by the response analyzing unit 452. Further, the status acquiring unit 453 delivers the response item to a function implementing unit 455 based on the acquired status. With this arrangement, each function implementing unit 455 can perform processing corresponding to the received response item.

The status acquiring unit 453 converts the response item into a data format provided on a function-implementing-unit-specific basis. If the data format corresponding to the response item is not stored in the data format storage unit 457, the status acquiring unit 453 converts the response item into the second description format to output the converted item.

The case in which the response item is written in the second description format may occur when the response item corresponds to the function implementing unit 455 that is newly added to the client PC 450, in a fashion similar to the case of the MFP 400. With the above-described arrangement, it is possible to output a response item and to request corresponding processing with respect to a function implementing unit 455 newly added to the client PC 450.

The function and configuration of the function implementing unit 455, the list management unit 456, the data format storage unit 457, and the communication unit 454 are similar to those of the counterpart units of the MFP 400, and a description thereof will be omitted.

<Example of Process of Analyzing Request>

Figure 5:
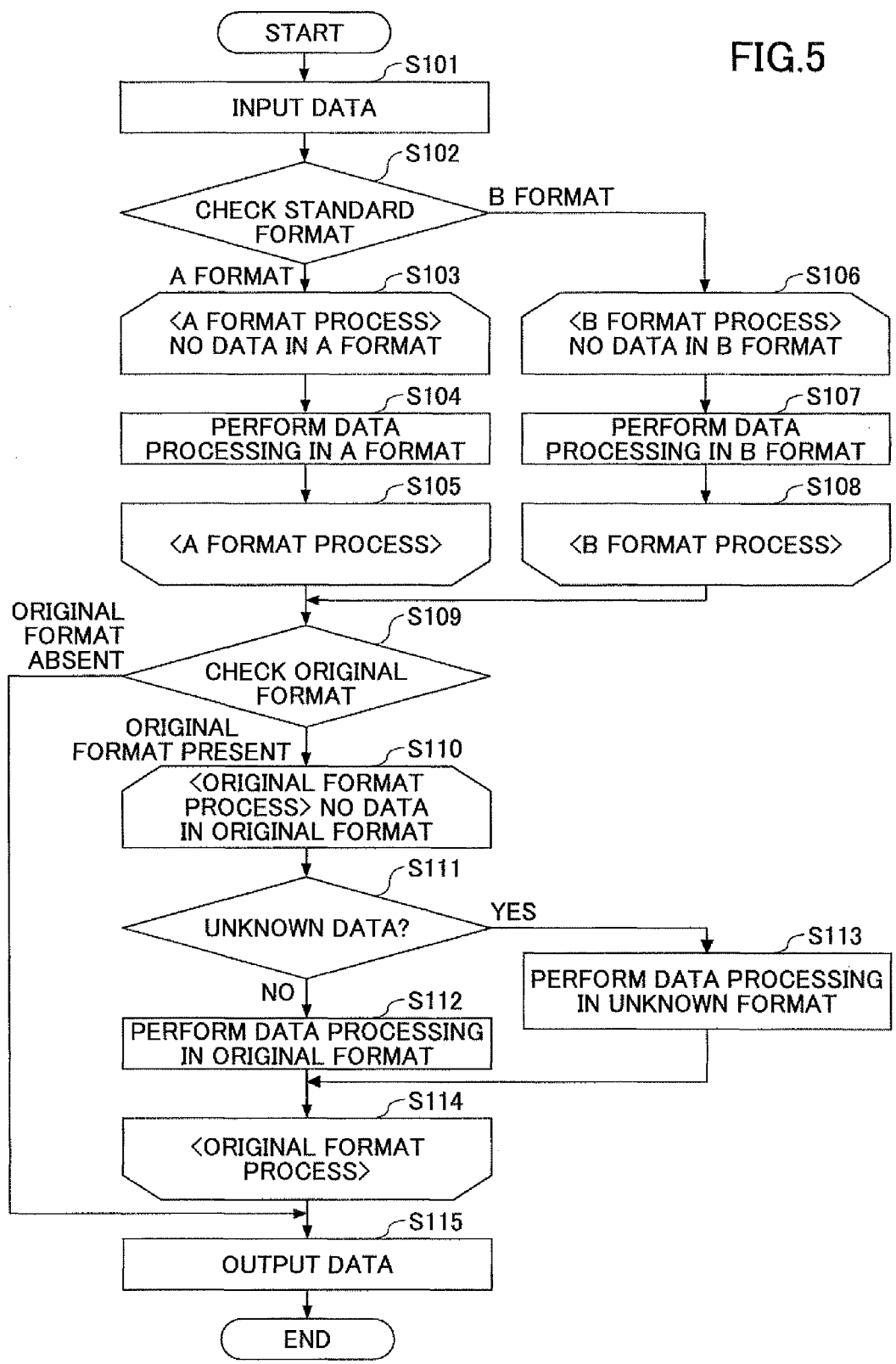
FIG. 5 is a flowchart illustrating an example of a process of analyzing a request.

FIG. 5 is a flowchart illustrating an example of a process of analyzing a request at the data processing unit 305. The process shown in FIG. 5 may be performed by the request analyzing unit 401, for example. In step 101 illustrated in FIG. 5, a request is applied to the data processing unit 305.

FIG. 6 is a drawing illustrating an example of a request. FIG. 6 illustrates an example of a request that requests to add a new record in an address book stored in memory at the MFP 400, for example. The above-noted memory may be implemented as the same unit as the data format storage unit 407.

The request illustrated in FIG. 6 includes a HTTP request header part R1 and a body R2 that contains one or more requested items. In the body R2, a description provided at the portion indicated by reference symbol "e" indicates that this request is described by use of "Atom" and extended formats defined by namespace "a" and namespace "vendor". The extended format defined by a namespace "vendor" corresponds to a requested item for a newly added function in the present embodiment.

R3 indicates a portion that is described in extended formats. R3 includes a mail address corresponding to the name "foo" and information such as a facsimile number relating to a record, which are provided as respective request items. R3 further includes a value g that has tags identified by the namespace "vendor".

By referring to FIG. 5 again, the procedure proceeds to step S102 after step S101. In step S102, the request analyzing unit 401 analyzes the request from the top to check the standard format. In this example, a check is made as to whether the standard format is an A format or a B format. The procedure proceeds to step S103 in the case of the A format, and proceeds to step S106 in the case of the B format.

The standard format refers to a universally-applicable standard such as APP or Atom if the request is described in XML, for example. The present embodiment is not limited to a case in which one standard format is selected from two formats. One or more standard formats may be selected and processed from three or more standard formats.

In step S103 to step S105 following step S102, the request analyzing unit 401 acquires a requested item with respect to a portion described in the A format. The process detail acquiring unit 402 then acquires the processing details corresponding to the requested item. The process details acquired here are expressed in a data format provided on a function-implementing-unit-specific basis. This operation is repeated until all the portion described in the A format is processed.

It should be noted that identification information identifying a function implementing unit is acquired by the request analyzing unit 401. Identification information identifying a function implementing unit may be contained in each requested item of the request, or may be provided in one-to-one correspondence to the description formats used in the request.

In step S106 to step S108 following step S102, the request analyzing unit 401 and the process detail acquiring unit 402 perform similar processes to those in steps S103 to S105 with respect to a portion described in the B format.

The procedure proceeds to processing of nonstandard formats after completing the processing of the portion described in the standard format. In step S109, the request analyzing unit 401 checks whether an original format (i.e., nonstandard format) is used in the request. If there is an original format, the procedure proceeds to step S110. Otherwise, the procedure proceeds to step S115. The check in step S109 may be performed by checking whether a set of requested items corresponding to the functions processed by the MFP 400 is in existence, rather than by checking whether an original format is in existence. If there is a set of requested items corresponding to the functions processed by the MFP 400, the procedure proceeds to step S110. Otherwise, the procedure proceeds to step S115.

In steps 3110 to S114 following step S109, the request analyzing unit 401 keeps performing the process of acquiring a requested item contained in the request until all the requested items are acquired. Each time a requested time is acquired, the process detail acquiring unit 402 checks in step S111 whether the processing details corresponding to the acquired requested item are found among already registered information. If the processing details are found among already registered information, the procedure proceeds to step S112. If the processing details are not found among already registered information, the procedure proceeds to step S113.

In step S112 following step S111, the process detail acquiring unit 402 acquires the processing details. The process details acquired here are expressed in a data format provided on a function-implementing-unit-specific basis. In step S113 following step S111, the process detail acquiring unit 402 converts the requested item into the second description format.

FIG. 7 is a drawing illustrating an example of conversion of a requested item into the second description format. In FIG. 7, a requested item h1 is formed from the namespace identified by reference symbol "f" and the element identified by reference symbol "g1", and a requested item h2 is formed from the namespace identified by reference symbol "f" and the element identified by reference symbol "g2".

In this manner, a function of a requested item can be performed even if the requested item contained in a request is directed to a function that is not registered in the MFP 400. Namely, a function implementing unit can perform the function of the requested item by performing the corresponding processing details in the corresponding data format or by performing processing based on the requested item described in the second data format. Accordingly, a client apparatus or the like that generates a request can transmit a request to the MFP 400 to use a certain function even if this function corresponds to a newly added function implementing unit.

By referring to FIG. 5 again, the procedure proceeds to step S114 after the process performed in step S112 or step S113. In step S114, the acquired processing details are supplied to the new function logic unit 310.

<Example of Process of Generating Response>

Figure 8:
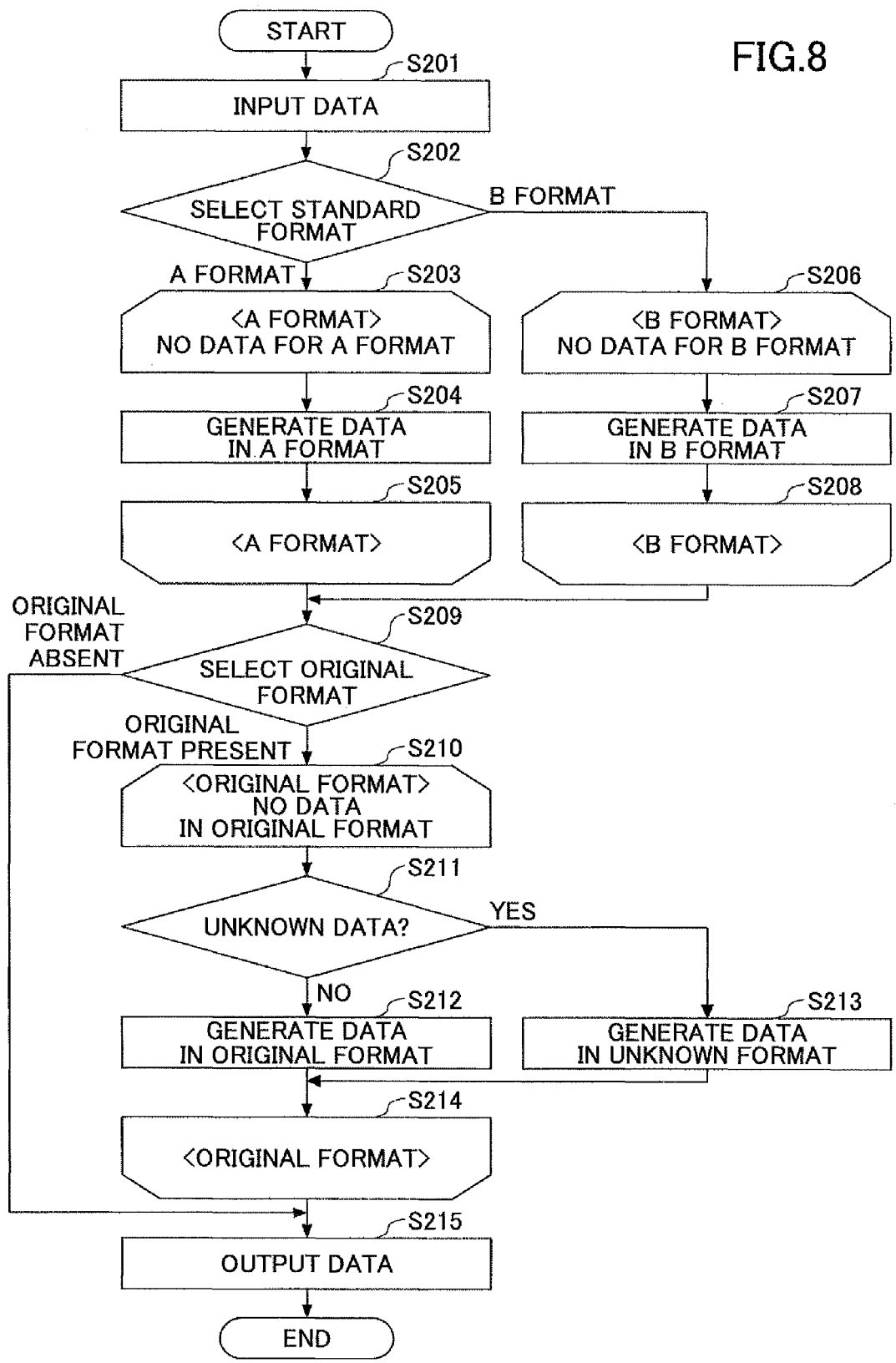
FIG. 8 is a flowchart illustrating an example of a process of generating a response.

FIG. 8 is a flowchart illustrating an example of a process of generating a response at the data processing unit 305. The process shown in FIG. 8 may be performed by the response generating unit 403, for example.

In step 201 illustrated in FIG. 8, data indicative of a response item to be contained in a response is supplied to the data processing unit 305. In step S202 following step S201, the response generating unit 403 selects a description format for a response based on the supplied data. In this step, a standard format is selected. The procedure proceeds to step S203 if the response is to be described in the A format, and proceeds to step S206 if the response is to be described in the B format.

The present embodiment is not limited to a case in which one standard format is selected from two standard formats. One or more standard formats may be selected from a plurality of standard formats, followed by generating a response described in the one or more selected standard formats.

In step S203 to step S205 following step S202, the response generating unit 403 keeps generating data of a response item described in the A format until there is no remaining data of a response item to be described in the A format. In step S206 to step S208 following step S202, the response generating unit 403 keeps generating data of a response item described in the B format until there is no remaining data of a response item to be described in the B format.

In step S209 following step S205 or step S208, the response generating unit 403 checks whether there is data of a response item that is to be described in an original format. If there is data to be described in an original format, the procedure proceeds to step S210. Otherwise, the procedure proceeds to step S215.

In step S210 to step S213 following step S209, the response generating unit 403 keeps performing the process of describing a response item in the original format until there is no remaining data of a response item to be described in the original format. In step S211, the response generating unit 403 checks whether the response item of interest is unknown data. Unknown data is the data that is written in a data format that is not registered in advance, for example. The unknown data is described in the second description format, for example. The second description format may have a namespace name, a variable or tag name, and a value.

If the data is known, the procedure proceeds to step S212. If the data is unknown data, the procedure proceeds to step S213. In step S212 following step S211, the response generating unit 403 refers to the data format of the acquired response item to generate a response in the first description format. In step S213 following step S211, the response generating unit 403 generates a response in the first description format from the acquired response item described in the second description format.

Figure 9:
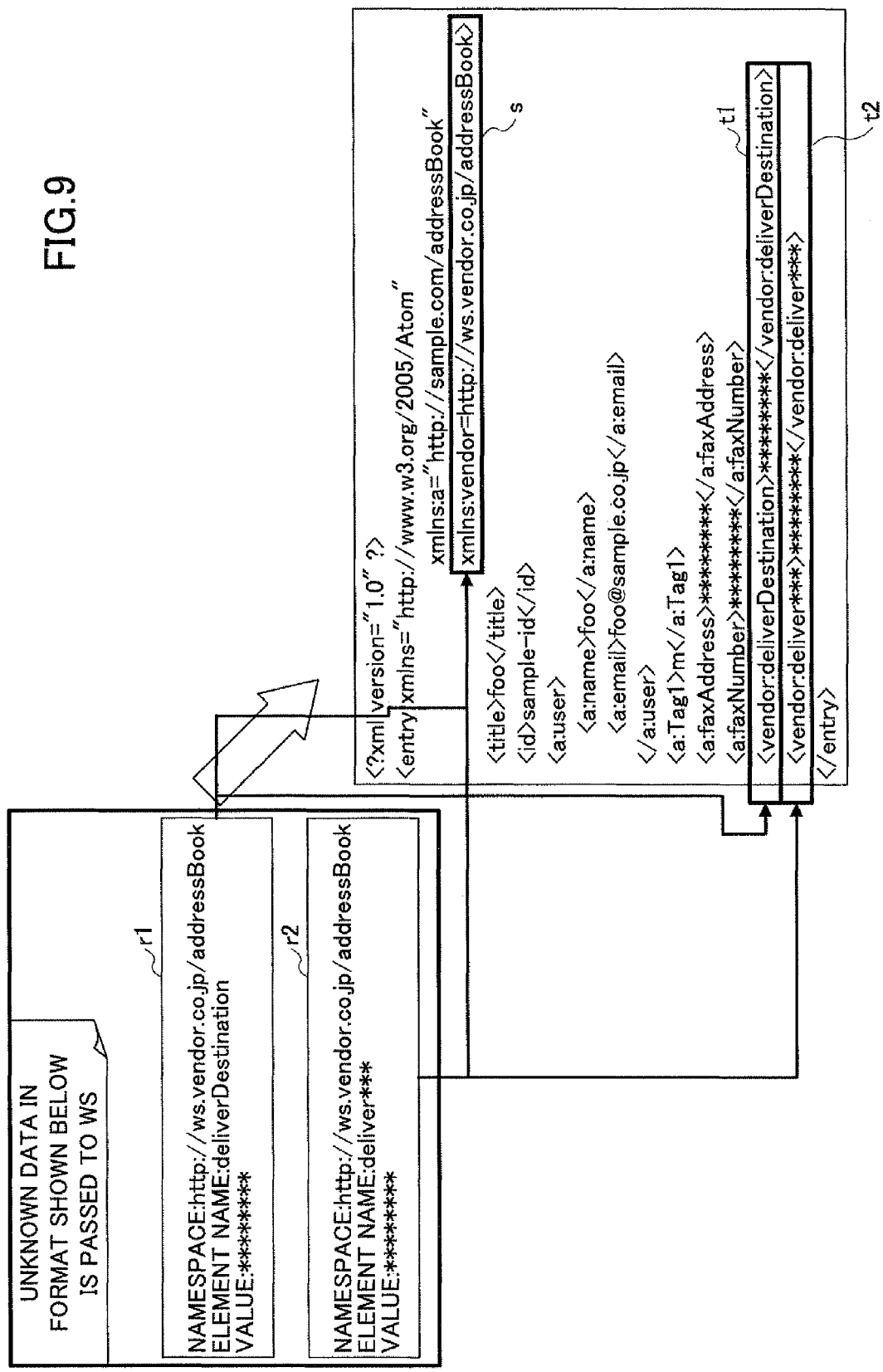
FIG. 9 is a drawing illustrating the generation of a response in a first description format from a response item described in the second description format.

FIG. 9 is a drawing illustrating the generation of a response in the first description format from a response item described in the second description format. In FIG. 9, a namespace "s" and an element "t1" are generated from a response item identified by reference symbol "r1", and the namespace "s" and an element "t2" are generated from a response item identified by reference symbol "r2".

By referring to FIG. 8 again, the procedure proceeds to step S215 after step S209 or step S214. In step S215, the response generated by the response generating unit 403 is supplied to the information processing logic unit 306.

<Example of Response>

FIGS. 10 and 11 are drawings illustrating examples of responses. FIG. 10 illustrates an example of a response generated from the request illustrated in FIG. 6. In FIG. 10, contents processed in response to the request of FIG. 6 are included. Namely, the name "foo", the mail address corresponding to the name, the corresponding facsimile number, and so on, which are contents of a record added to the address book, are included as respective response items. Further, a response item indicative of an operation performed on the address book identified by the namespace "vendor" is included in the portion identified by reference symbol "u1".

FIG. 11 illustrates an example of a response generated from the request illustrated in FIG. 6, which is a different example from the one illustrated in FIG. 10. The response illustrated in FIG. 11 does not include response items relating to "faxAddress" and "faxNumber". This is because the image forming apparatus (MFP) that has generated this response is not provided with the function to include such information in an address book.

When data in the address book is to be edited, PUT defined in HTTP may be used to enter a request and to output a response in response to the request. When data in the address book is to be referred to, GET defined in HTTP may be used to output response data. When data in the address book is to be deleted, DELETE defined in HTTP may be used without exchanging data through a request and a response.

In the manner described above, the I/F is unified so that Web service functional extension can be dynamically performed.

<Internal Configuration of Web Service Framework>

Figure 12:
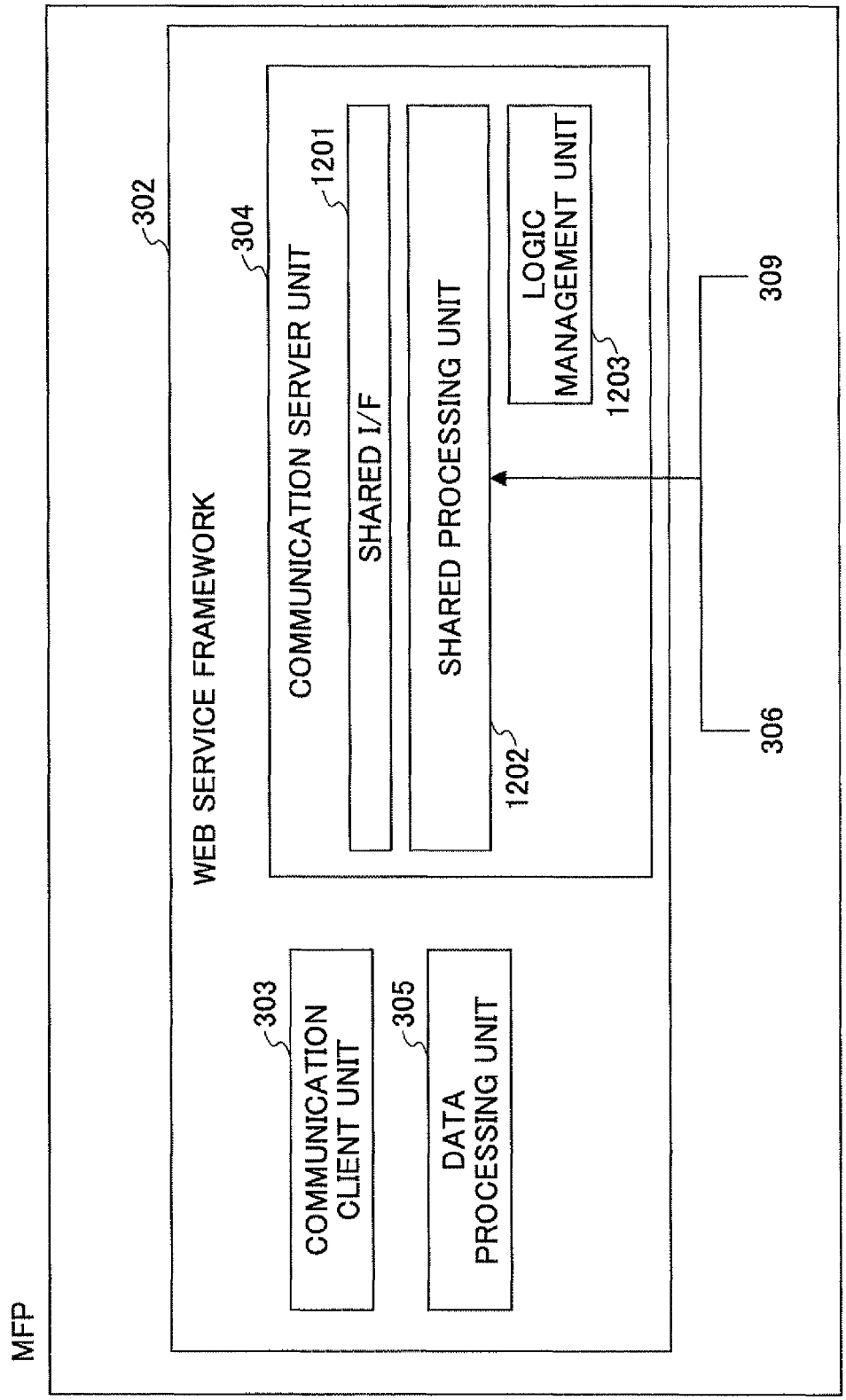
FIG. 12 is a drawing illustrating an internal configuration of a Web service framework.

FIG. 12 is a drawing illustrating the internal configuration of a Web service framework. The same elements as those of FIG. 3 are referred to by the same numerals, and a description thereof will be omitted. The communication server unit 304 includes a shared I/F 1201, a shared processing unit 1202, and a logic management unit 1203.

The shared I/F 1201 is an I/F unit for which a plurality of I/Fs are defined for shared use. The shared processing unit 1202 is a processing unit for which shared processes corresponding to respective I/Fs of the shared I/F 1201 are defined. A user (i.e., logic unit) of the framework implements only one or more necessary processes (i.e., I/F) required to perform its own function among the processes defined in the shared processing unit 1202.

The logic management unit 1203 stores in memory a logic name and a URI serving as an identifier for each function used in the Web service, such that the logic name and the URI are associated with each other for management purposes. Here, the logic name may be a class name as defined in JAVA (registered trademark). When an identifier to be managed is included in a request, a new function logic unit 310 is generated based on the identifier and a class name.

Figure 13:
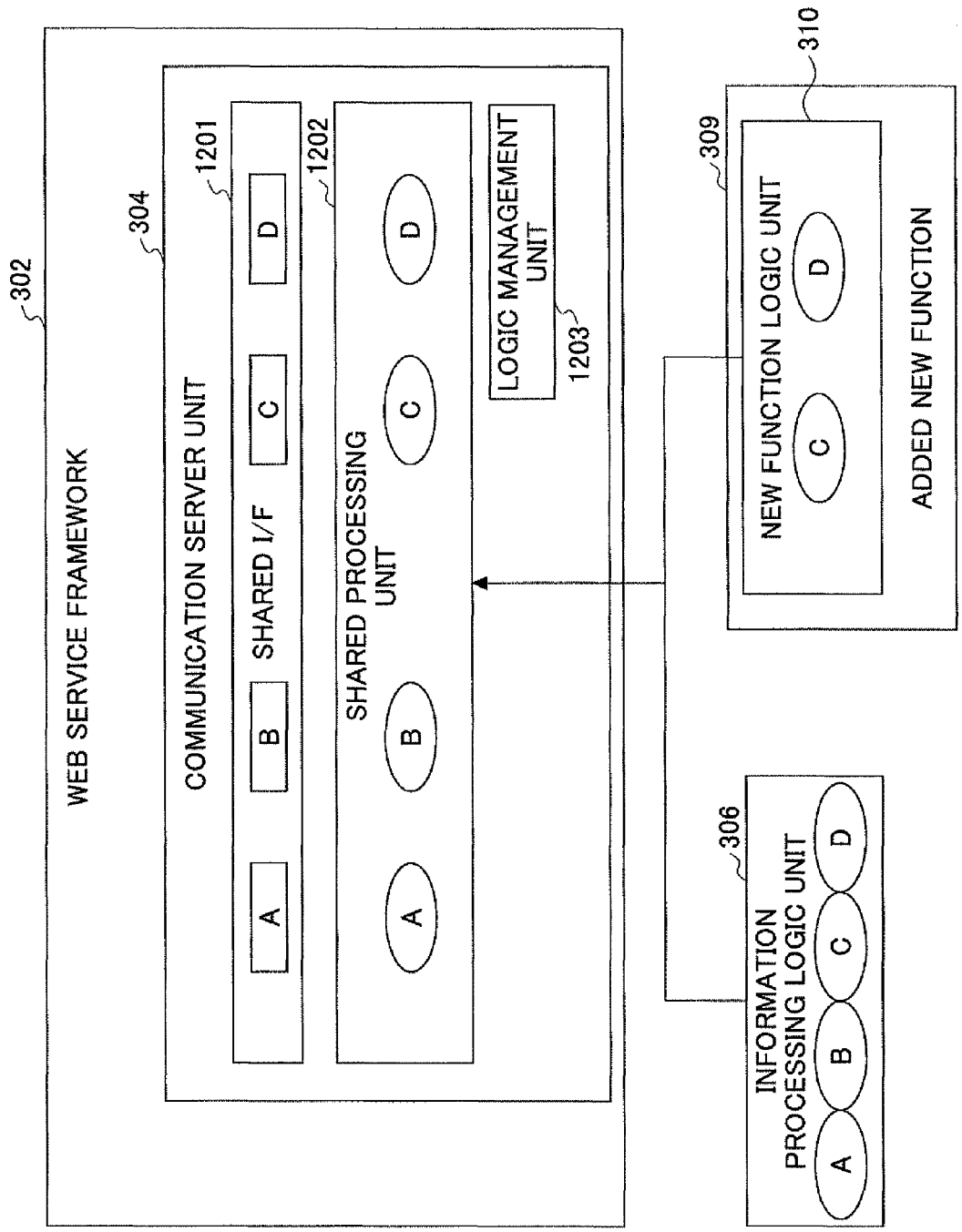
FIG. 13 is a drawing illustrating an example of a shared I/F and a shared processing unit.

FIG. 13 is a drawing illustrating an example of the shared I/F 1201 and the shared processing unit 1202. As illustrated in FIG. 13, I/Fs identified as A through D are defined in the shared I/F 1201, and processes corresponding to these I/Fs identified as A through D are defined in the shared processing unit 1202. Letters A through D may represent GET, DELETE, and the like, for example.

In the example illustrated in FIG. 13, the information processing logic unit 306 requires all the processes A through D defined in the shared processing unit 1202, while the new function logic unit 310 requires only the processes C and D for the purpose of performing its intended function. In this manner, shared processes corresponding to the shared I/Fs (A through D) are defined in the framework.

<Internal Configuration of Logic Management Unit>

Figure 14:
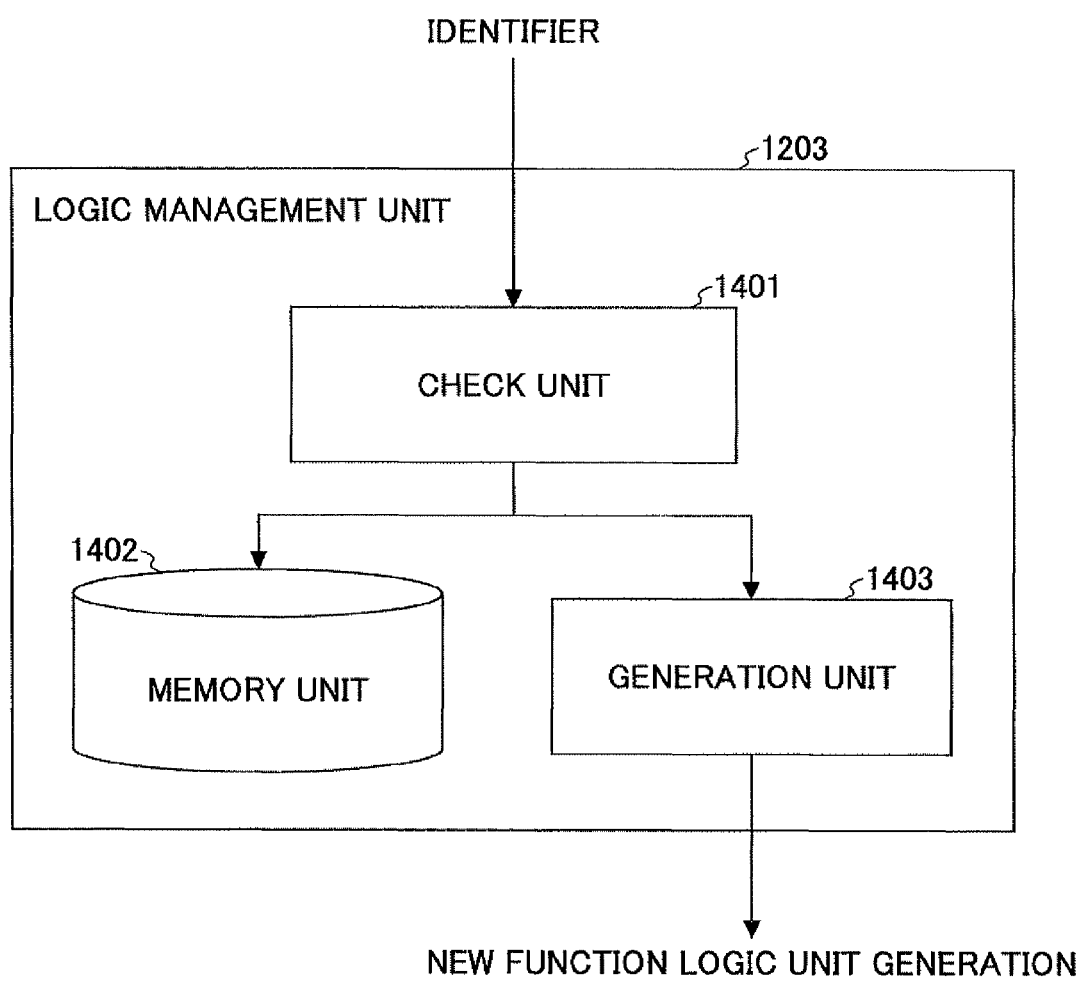
FIG. 14 is a drawing illustrating an internal configuration of a logic management unit.

FIG. 14 is a drawing illustrating the internal configuration of a logic management unit. As illustrated in FIG. 14, the logic management unit 1203 includes a check unit 1401, a memory unit 1402, and a generation unit 1403. The check unit 1401 acquires an identifier (e.g., URI) contained in a request, and checks whether the acquired identifier is found among the identifiers stored in the memory unit 1402.

The memory unit 1402 stores a logic name and an identifier (e.g., URI) of a Web service in such a manner that they are associated with each other. FIG. 15 is a drawing illustrating an example of a management table stored in the memory unit 1402. As illustrated in FIG. 15, an identifier IDENTIFIER1 and a logic name LOGIC_NAME1 are stored and associated with each other.

The management table merely stores acquired identifiers and logic names without discriminating existing functions from new functions. This arrangement allows each function to be easily added or removed regardless of whether the function is new or old.

Referring to FIG. 14 again, the generation unit 1403 generates a new function logic unit 310 based on the logic name and identifier listed in the management table stored in the memory unit 1402.

<Process of Adding New Function>

Figure 16:
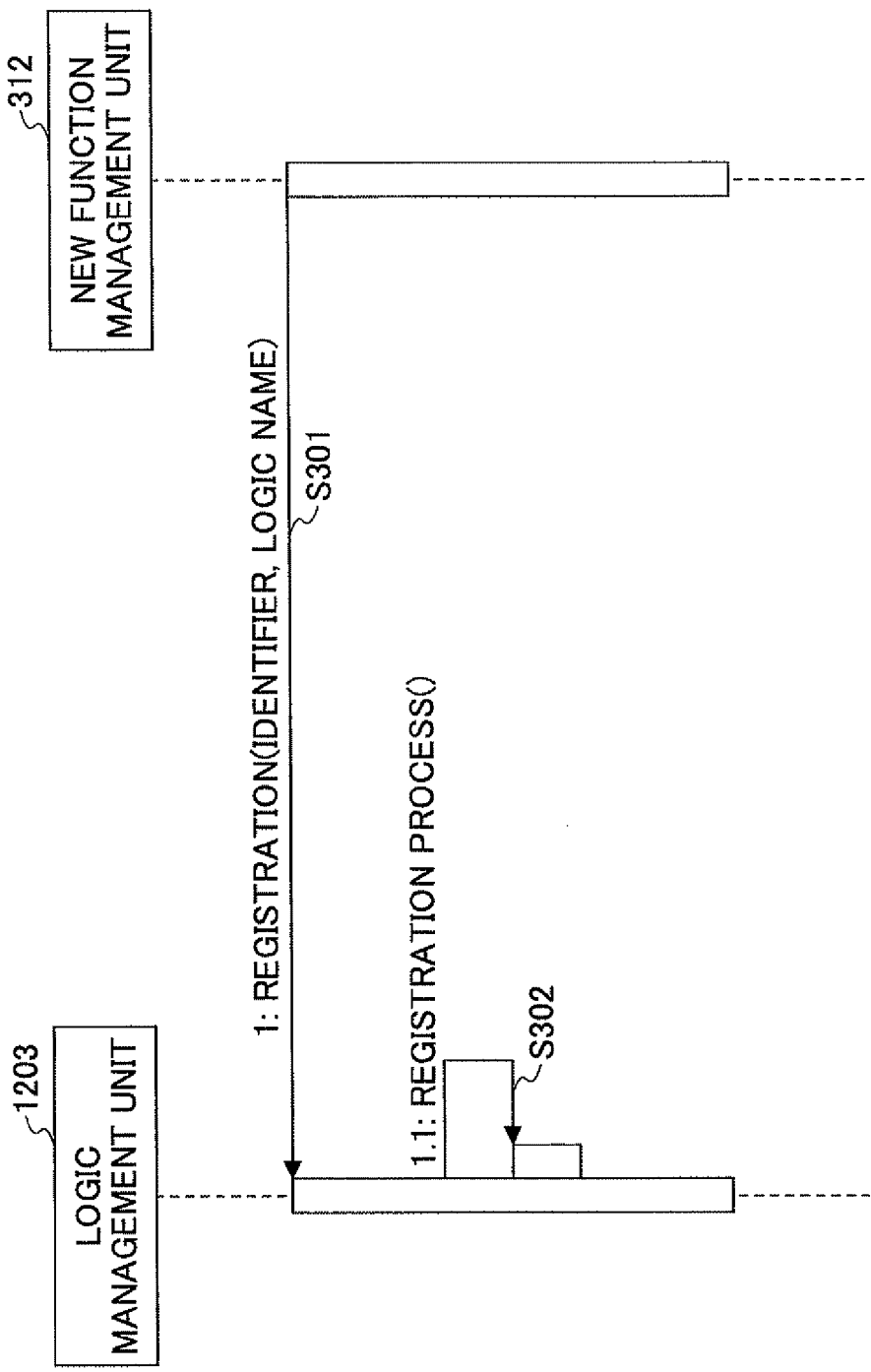
FIG. 16 is a sequence chart illustrating the process of registering a newly added function in a management table.

FIG. 16 is a sequence chart illustrating the process of registering a newly added function in a management table. In step S301, the new function management unit 312 included in the added new function 309 supplies a logic name and URI of the new function to the logic management unit 1203.

In step S302 following step S301, the logic management unit 1203, upon receiving the logic name and identifier from the new function management unit 312, registers (i.e., stores) them in the management table and associates them with each other. With this arrangement, the added new function can be used upon receiving a request requesting the use of the added new function.

<Process of Deleting New Function>

Figure 17:
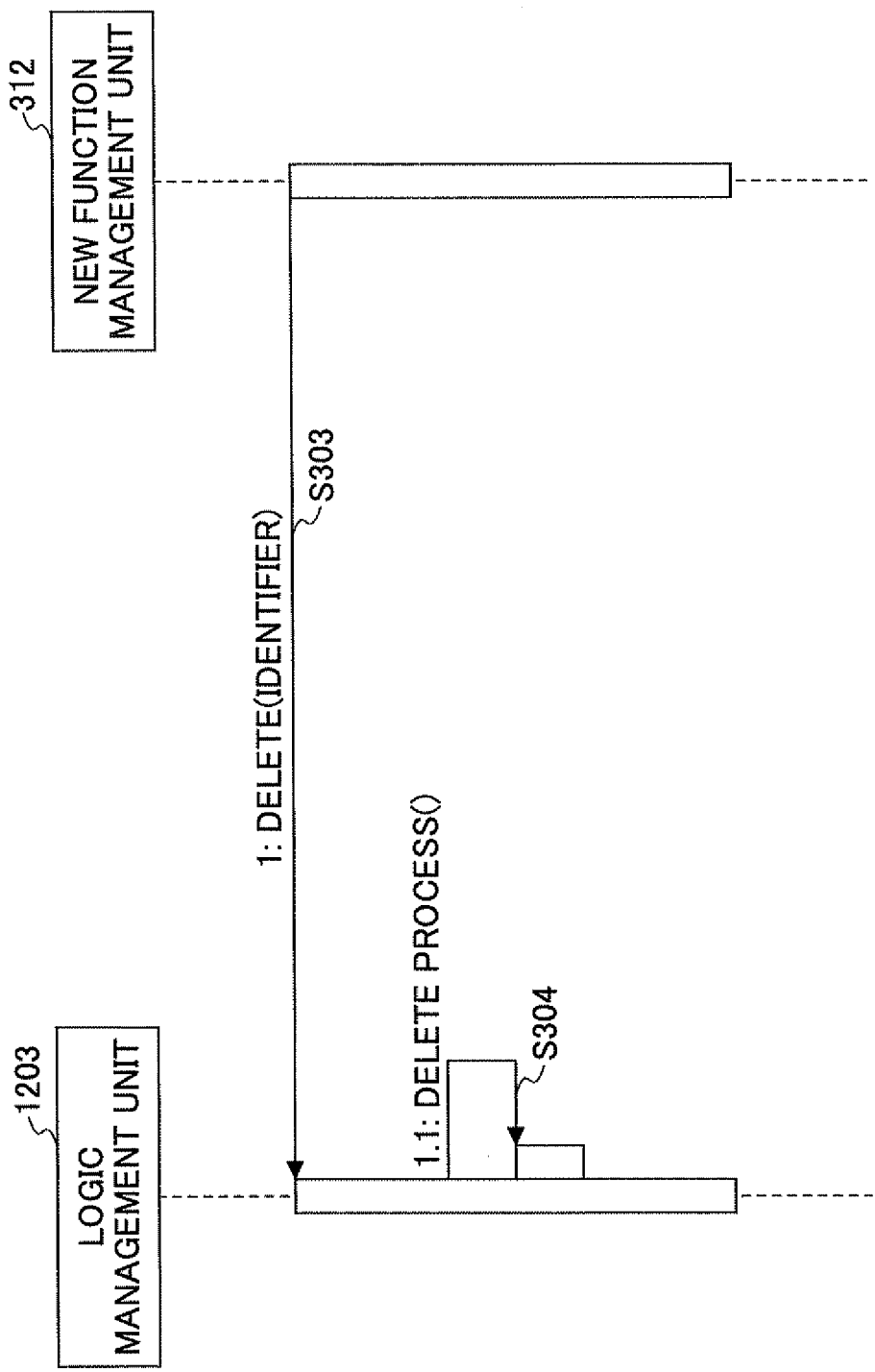
FIG. 17 is a sequence chart illustrating a deletion process performed with respect to a management table upon deleting a new function.

FIG. 17 is a sequence chart illustrating a deletion process performed with respect to a management table upon deleting a new function. In step S303, the new function management unit 312 included in the added new function 309 supplies the identifier of the new function to the logic management unit 1203 for the purpose of deleting the added new function.

In step S304 following step S303, the logic management unit 1203, upon receiving the identifier from the new function management unit 312, deletes the received identifier and the logic name corresponding to this identifier. With this arrangement, the added new function can be deleted when there is no need to use this new function any longer.

As illustrated in FIG. 16 and FIG. 17, the addition and deletion of a new function can be performed during the ongoing operation of the MFP, thereby allowing a function-specific addition and deletion to be performed at any desired time.

<Process Responding to Reference Request from Client PC>

Figure 18:
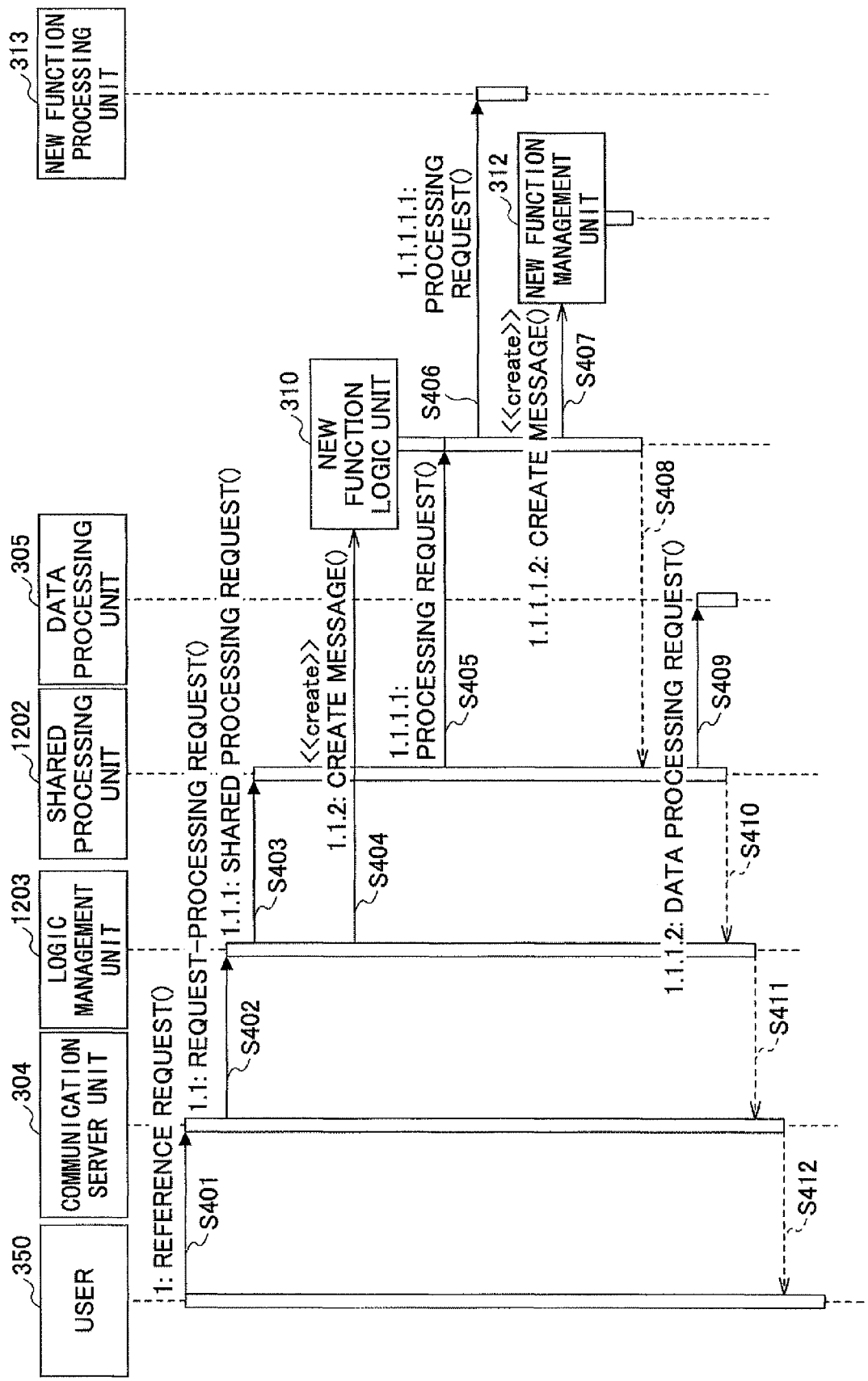
FIG. 18 is a sequence chart illustrating a process performed in response to a reference request from a client.

FIG. 18 is a sequence chart illustrating a process performed in response to a reference request from a client PC. In step S401, a user uses the client PC 350 to transmit to the MFP 300 a request that contains a requested item for a reference request. The request may be transmitted as an http request. Further, the request is described in the first description format using a description language such as XML.

In step S402 following step S401, the communication server unit 304 issues to the logic management unit 1203 a request to process the request received in step S401. In step S403 following step S402, the logic management unit 1203 requests the shared processing unit 1202 to perform shared processing.

In step S404 following step S403, the logic management unit 1203 acquires an identifier contained in the request, and checks whether the acquired identifier is found in the management table that the logic management unit 1203 manages. If the acquired identifier is found in the management table, the logic management unit 1203 creates a new function logic unit 310 based on the logic name and identifier stored in the management table.

In step S405 following step S404, the shared processing unit 1202 sends a process request to the created new function logic unit 310, thereby requesting that the requested items in the request be processed. In step S406 following step S405, the new function logic unit 310 checks whether there is data to be processed for requested items contained in the request. The detail of this check will be described later.

When a request that the new function processing unit 313 perform processing is provided, the new function logic unit 310 performs conversion into a data format corresponding to the new function processing unit 313 to make a process request.

In step S407 following step S406, the new function logic unit 310 generates a new function management unit 312 based on the data acquired by reference from the new function processing unit 313. The new function management unit 312 retains new function extension data.

In step S408 following step S407, the new function logic unit 310 acquires a response item indicative of the completion of processing, and requests the shared processing unit 1202 to generate a response including the response item. The response item may be given in a predetermined data format, or may be given in the second description format. The second description format may have a namespace containing the response item, a variable or tag name, and a value if the response is to be described in XML, for example.

In step S409 following step S408, the shared processing unit 1202 requests the data processing unit 305 to generate a response if the response is to include the response item.

In step S410 following step S409, the shared processing unit 1202 supplies, to the logic management unit 1203, the response generated by the data processing unit 305 including the response item. The response is described in the first description format, which may be expressed in XML, for example. More specifically, the response may be expressed by use of APP, Atom, or another extension format. Which format is used depends on the contents of a request specifying in what format a response should be returned and on what formats are supported by the image forming apparatus.

In step S411 following step S410, the logic management unit 1203 supplies to the communication server unit 304 the response together with a request to transmit the response. In step S412 following step S411, the communication server unit 304 transmits the response to the client PC 350.

<Process Responding to Data Creation/Modification Request from Client PC>

In the following, a description will be given of a case in which a data creation/modification request is received from a client. A data creation/modification request differs from a reference request in that data to be processed is present in a requested item.

Figure 19:
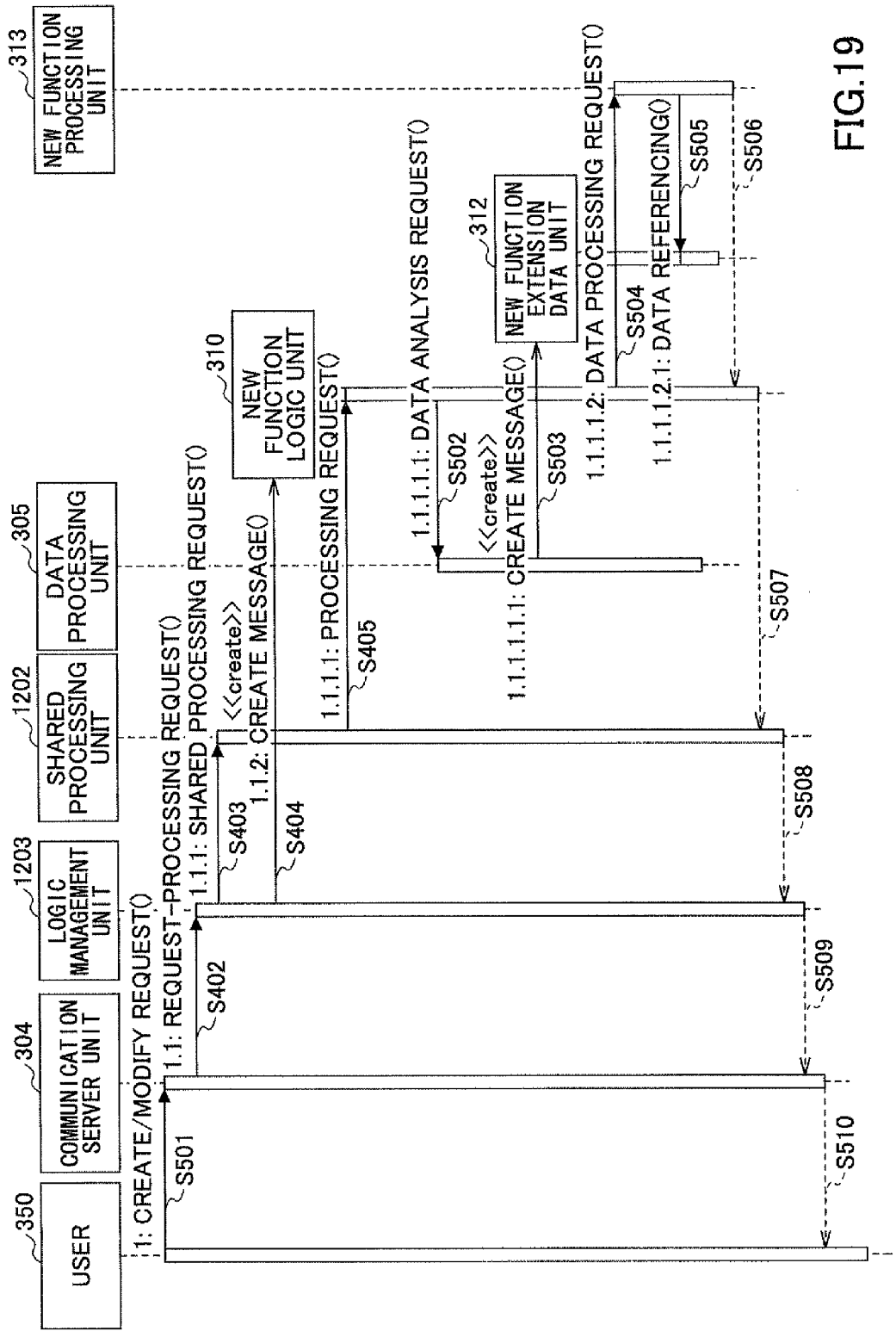
FIG. 19 is a sequence chart illustrating a process performed in response to a data creation/modification request supplied from a client.

FIG. 19 is a sequence chart illustrating a process performed in response to a data creation/modification request supplied from a client. The same elements as those of FIG. 18 are referred to by the same numerals, and a description thereof will be omitted.

In step S501, a user uses the client PC 350 to transmit to the MFP 300 a request that contains a requested item requesting creation/modification. The request contains data that is to be processed according to the requested item.

Upon receiving a process request from the shared processing unit 1202, in step S502, the new function logic unit 310 requests the data processing unit 305 to analyze the data to be processed. In step S503 following step S502, the data processing unit 305 creates a new function management unit 312 in which to retain extension data if there is data to be extended according to the analysis of the acquired data.

In step S504 following step S503, the new function logic unit 310 issues to the new function processing unit 313 a request that the requested item be converted into a predetermined data format and that the converted processing details be performed.

In step S505 following step S504, the new function processing unit 313 performs processing in accordance with the acquired processing details. In so doing, the new function processing unit 313 refers to the data of the new function management unit 312 to perform the processing.

In step S506 following step S505, the new function processing unit 313 sends a notice indicative of the completion of processing to the new function logic unit 310 upon completing the processing. In step S507 following step S506, the new function logic unit 310 sends a notice indicative of the completion of processing to the shared processing unit 1202.

In step S508 following step S507, the shared processing unit 1202 sends a notice indicative of the completion of processing to the logic management unit 1203. In step S509 following step S50S, the logic management unit 1203 issues to the communication server unit 304 a request that a notice of the completion of processing be sent to the client PC 350. In step S510 following step S509, the communication server unit 304 sends a notice indicative of the completion of processing to the client PC 350. For example, the notice may be transmitted as an http response.

<Processing by Client PC>

Figure 20:
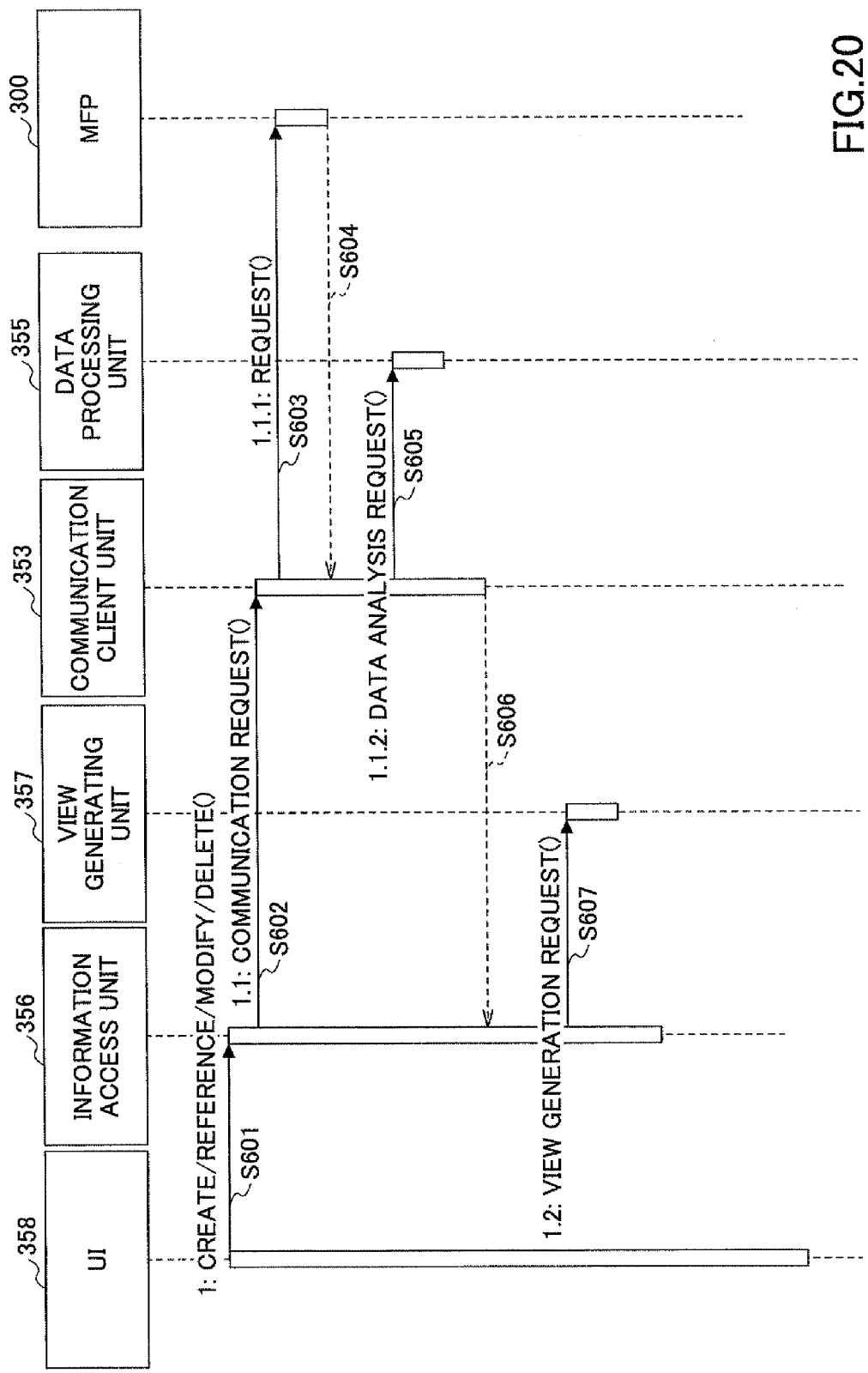
FIG. 20 is a sequence chart illustrating a processes performed by a client PC.

In the following, a description will be given of a series of processes performed when the client PC 350 receives a response from the MFP 300 after transmitting a request to the MFP 300. FIG. 20 is a sequence chart illustrating the processes performed by a client PC.

In step S601, the UI 358 supplies a user-indicated requested item requesting creation, reference, modification, or deletion to the information access unit 356. In step S602 following step S601, the information access unit 356 issues to a communication client unit 353 a communication request that the user-indicated request be transmitted to the MFP 300.

In step S603 following step S602, the communication client unit 353 transmits the requested item as a request to the MFP 300. The request includes an identifier identifying a function implementing unit that is used to process the requested item.

In step S604 following step S603, the MFP 300 transmits a response to the communication client unit 353 in response to the request. In step S605 following step S604, the communication client unit 353 sends the received response to the data processing unit 355.

As was previously described, the communication client unit 353 acquires a response item by analyzing the data of the received response described in the first description format.

In step S606 following step S605, the communication client unit 353 sends the analyzed response item to the information access unit 356. In step S607 following step S606, the information access unit 356 requests the view generating unit 357 to generate a display screen based on the response item. In the following, a description will be given of the view generating unit 357 receiving a request to generate a display screen.

<Process by View Generating Unit>

Figure 21:
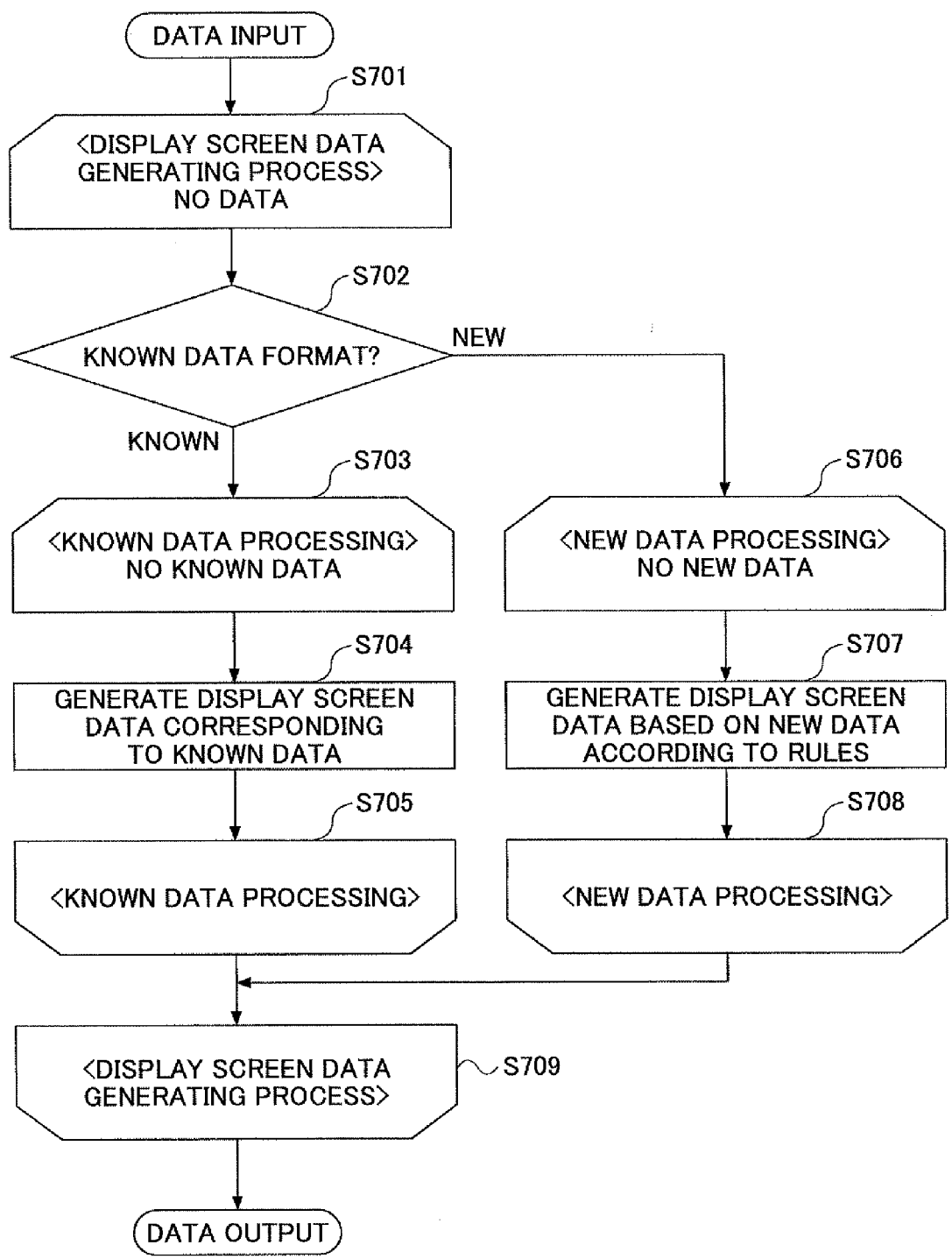
FIG. 21 is a sequence chart illustrating a process of generating a display screen at the client PC.

FIG. 21 is a flowchart illustrating a process of generating display screen data at a client PC. In step S701 to step S709, the view generating unit 357 keeps generating display screen data until there is no remaining response item data.

In step S702, a check is made as to whether the response item data is provided in a known data format. If it is ascertained in step S702 that a known data format is used, processes in step S703 to step S705 are repeatedly performed to generate display screen data corresponding to the known data.

If it is ascertained in step S702 that a new data format is used, processes in step S706 to step S708 are repeatedly performed to generate display screen data according to predetermined rules with respect to the new data. Here, the term "new data format" refers to a data format of data corresponding to the newly extended function of the MFP 300. The term "predetermined rules" refers to rules that are used at the client PC to generate display screen data with respect to the known data.

With this arrangement, display screen data can be generated based on the new data according to the existing display format since the new data received by the view generating unit 357 is described in a predetermined data format (i.e., first description format).

<Process Performed Upon Adding Address Book as New Function>

Figure 22:
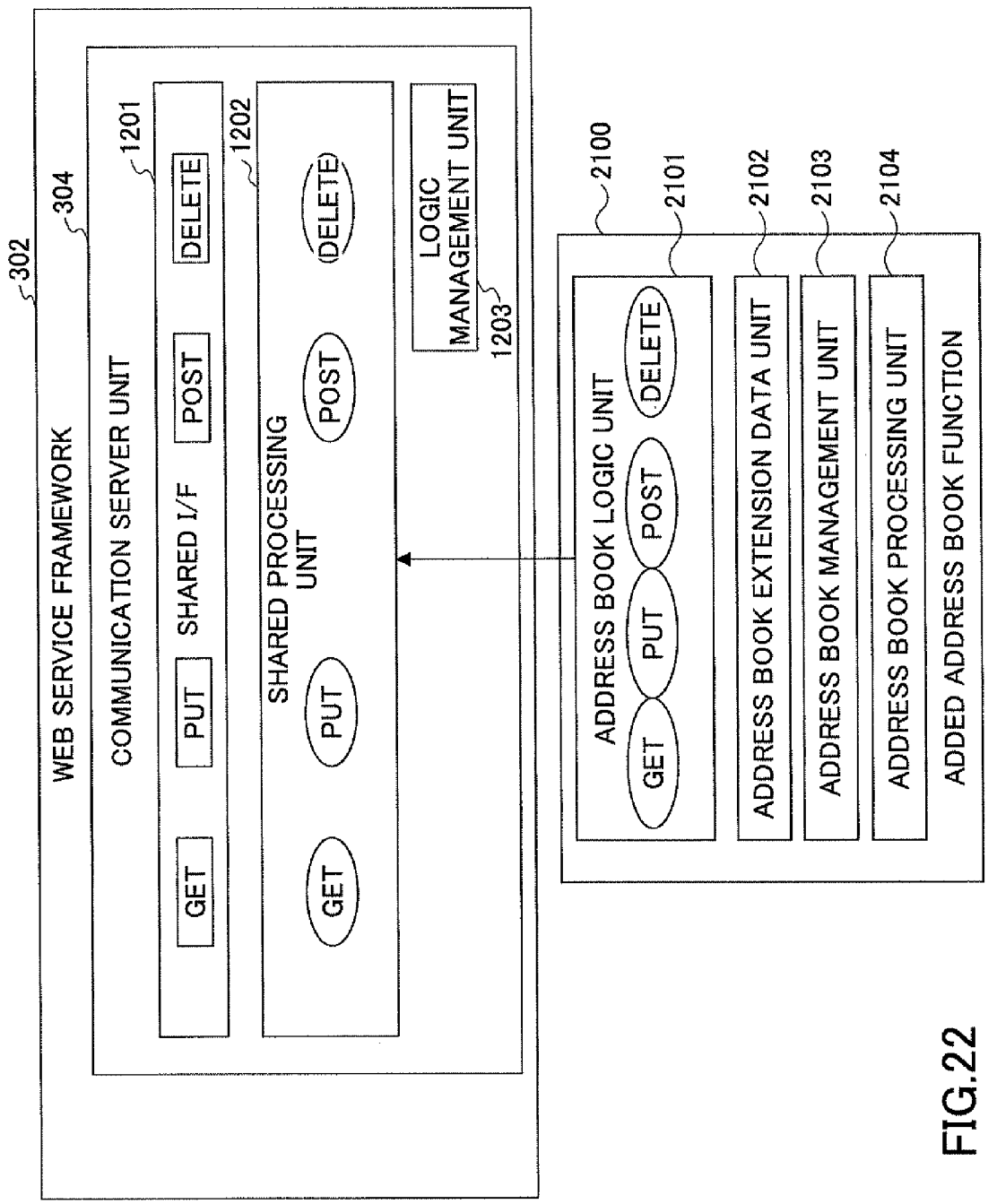
FIG. 22 is a drawing illustrating an example of an added address book function.

In the following, a specific example of the present embodiment will be described. In this example, a description will be given of a process performed upon adding an "address book function" as a new function to an MFP when the address book function is not present in the MFP. FIG. 22 is a drawing illustrating an example of the added address book function.

As illustrated in FIG. 22, an address book logic unit 2101 is generated such as to provide address book functions corresponding to all the I/Fs (GET: refer, PUT: modify, POST: create:, and DELETE: delete) defined in the framework.

An address book extension data unit 2102 retains extended data in a predetermined description format. FIG. 23 is a drawing illustrating an example of data retained in the address book extension data unit 2102. In the example illustrated in FIG. 23, the address book extension data unit 2102 has data described in XML.

Referring to FIG. 22 again, an address book management unit 2103 supplies a logic name and identifier identifying the address book function to the logic management unit 1203 when this address book function is added to the MFP. An example of such an identifier may be "/addressbook". An address book processing unit 2104 performs processing defined in the address book logic unit 2101.

Figure 24:
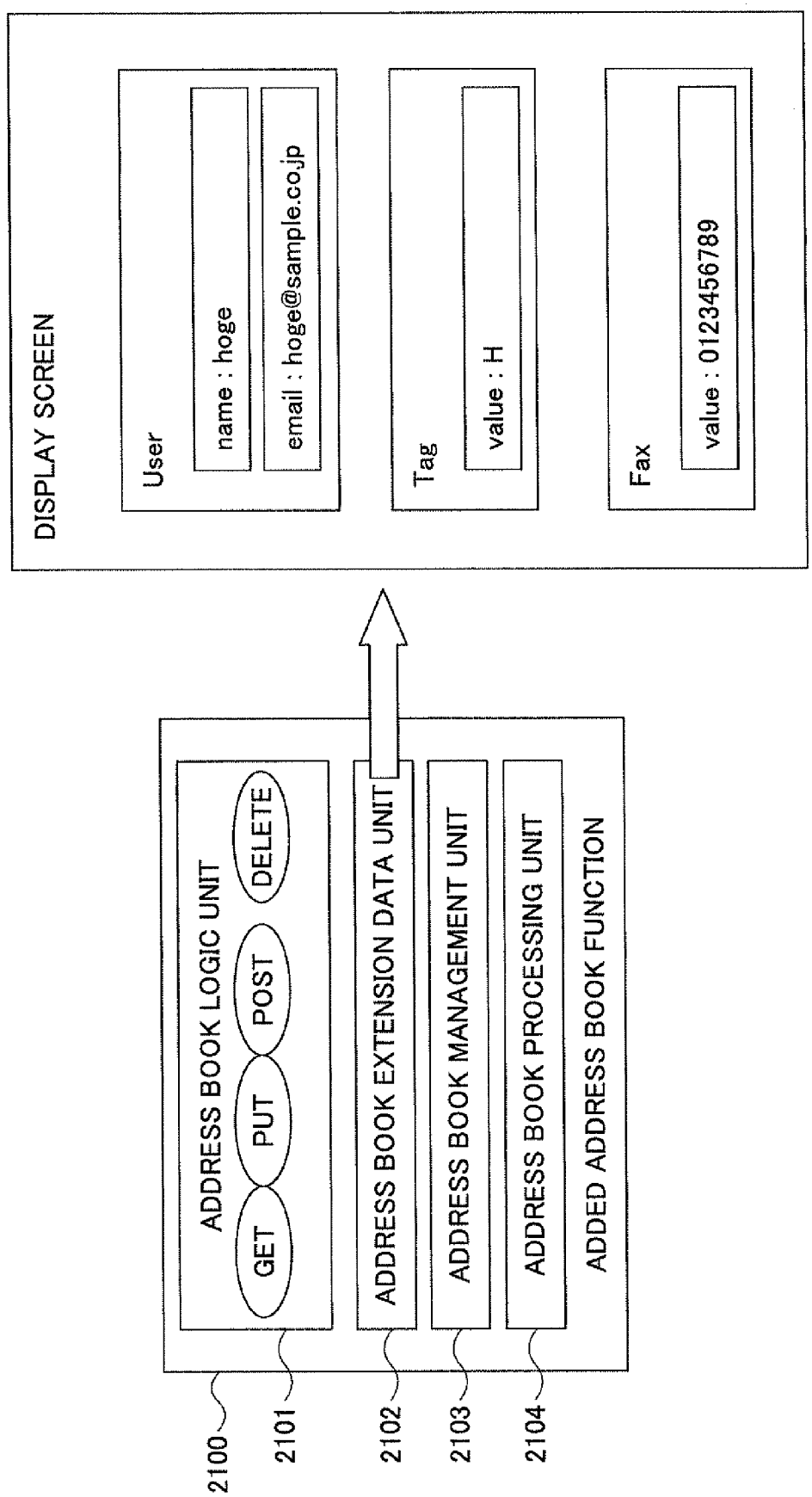
FIG. 24 is a drawing illustrating an example of address book extension data displayed on a display screen.

FIG. 24 is a drawing illustrating an example of address book extension data displayed on a display screen. The example illustrated in FIG. 24 corresponds to the extension data illustrated in FIG. 23 as displayed on a display screen.

<Process at MFP upon Referring to Added Address Book>

Figure 25:
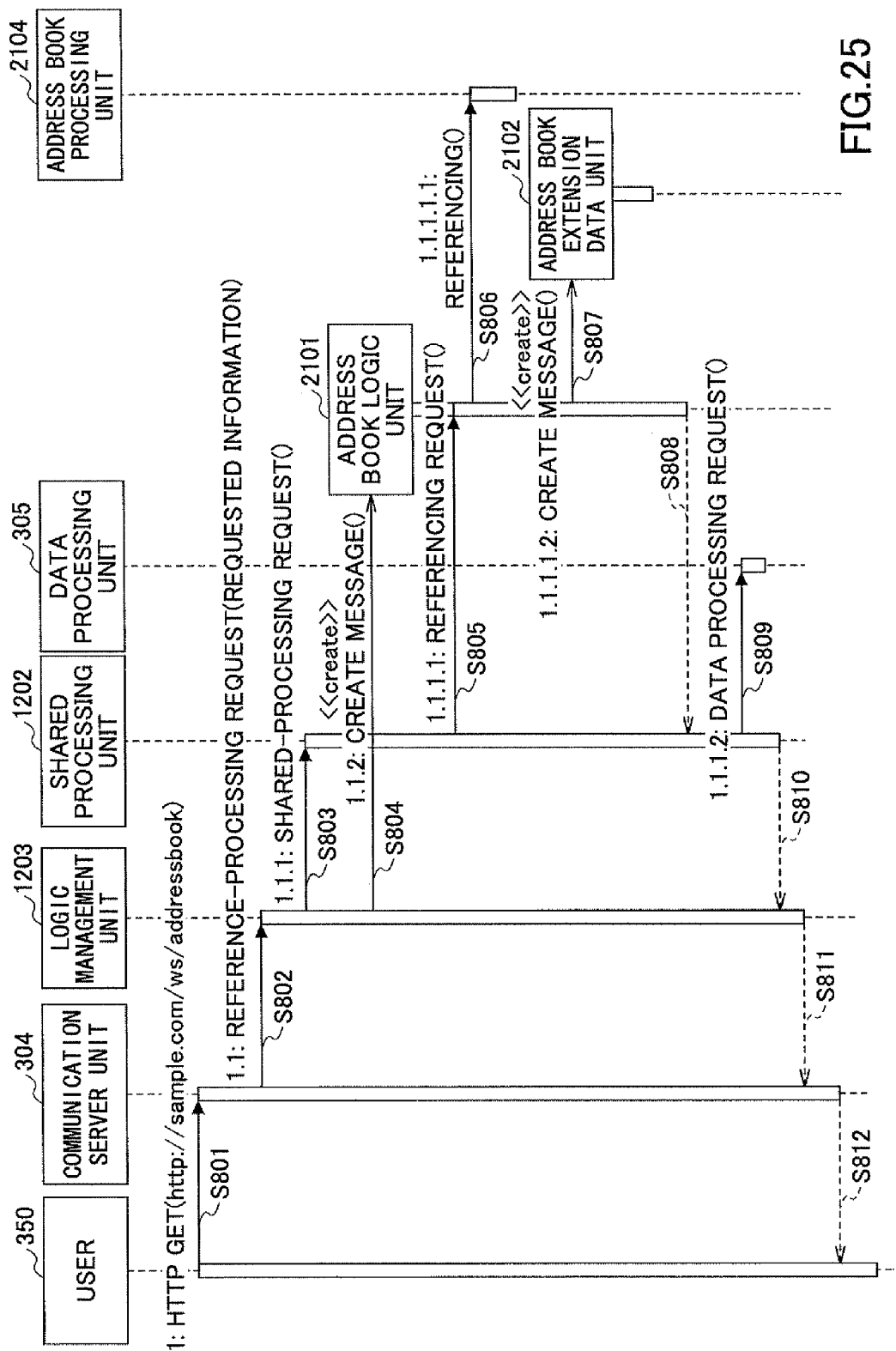
FIG. 25 is a sequence chart illustrating a process performed in response to a reference request to refer to an address book from a client.

FIG. 25 is a sequence chart illustrating a process performed in response to a reference request to refer to an address book from a client. In step S801, a user uses the client PC 350 to transmit to the MFP 300 a request that contains a requested item requesting to refer to an address book. The request may be transmitted as an http request. In this example, GET(http://sample.com/ws/addressbook) is sent to the communication server unit 304.

In step S802 following step S801, the communication server unit 304 issues to the logic management unit 1203 a request to process the request received in step S101. In step S803 following step S802, the logic management unit 1203 requests the shared processing unit 1202 to perform shared processing.

In step S804 following step S803, the logic management unit 1203 acquires an identifier (i.e., /addressbook) contained in the request, and checks whether the acquired identifier is found in the management table that the logic management unit 1203 manages. If the acquired identifier is found in the management table, the logic management unit 1203 creates an address book logic unit 2101 based on the logic name and identifier stored in the management table.

In step S805 following step S804, the shared processing unit 1202 sends a process request to the created address book logic unit 2101, thereby requesting that the requested item (i.e., reference) in the request be processed. In step S806 following step S805, the address book logic unit 2101 requests the address book processing unit 2104 to process the requested item (i.e., reference) contained in the request.

In step S807 following step S806, the address book logic unit 2101 generates an address book extension data unit 2102 based on the data acquired by reference from the address book processing unit 2104. The address book extension data unit 2102 retains new function (address book function) extension data.

In step S808 following step S807, the address book logic unit 2101 acquires a response item indicative of the completion of processing, and requests the shared processing unit 1202 to generate a response including the response item. The response item may be given in a predetermined data format, or may be given in the second description format. The second description format may have a namespace containing the response item, a variable or tag name, and a value if the response is to be described in XML, for example.

In step S809 following step S808, the shared processing unit 1202 requests the data processing unit 305 to generate a response if the response is to include the response item.

In step S810 following step S809, the shared processing unit 1202 supplies, to the logic management unit 1203, the response generated by the data processing unit 305 including the response item. The response is described in the first description format, which may be expressed in XML, for example. More specifically, the response may be expressed by use of APP, Atom, or other extension format. Which format is used depends on the contents of a request specifying in what format a response should be returned and on what formats are supported by the image forming apparatus.

In step S811 following step S810, the logic management unit 1203 supplies to the communication server unit 304 the response together with a request to transmit the response. In step S412 following step S411, the communication server unit 304 transmits the response to the client PC 350.

In this manner, there is neither a need to acquire a WSDL corresponding to an added address book nor a need to create a special program for the added address book function. The client PC 350 can use the new function of MFP by simply modifying an identifier.

<Process at Client to Issue Request to Modify Added Address Book>

Figure 26:
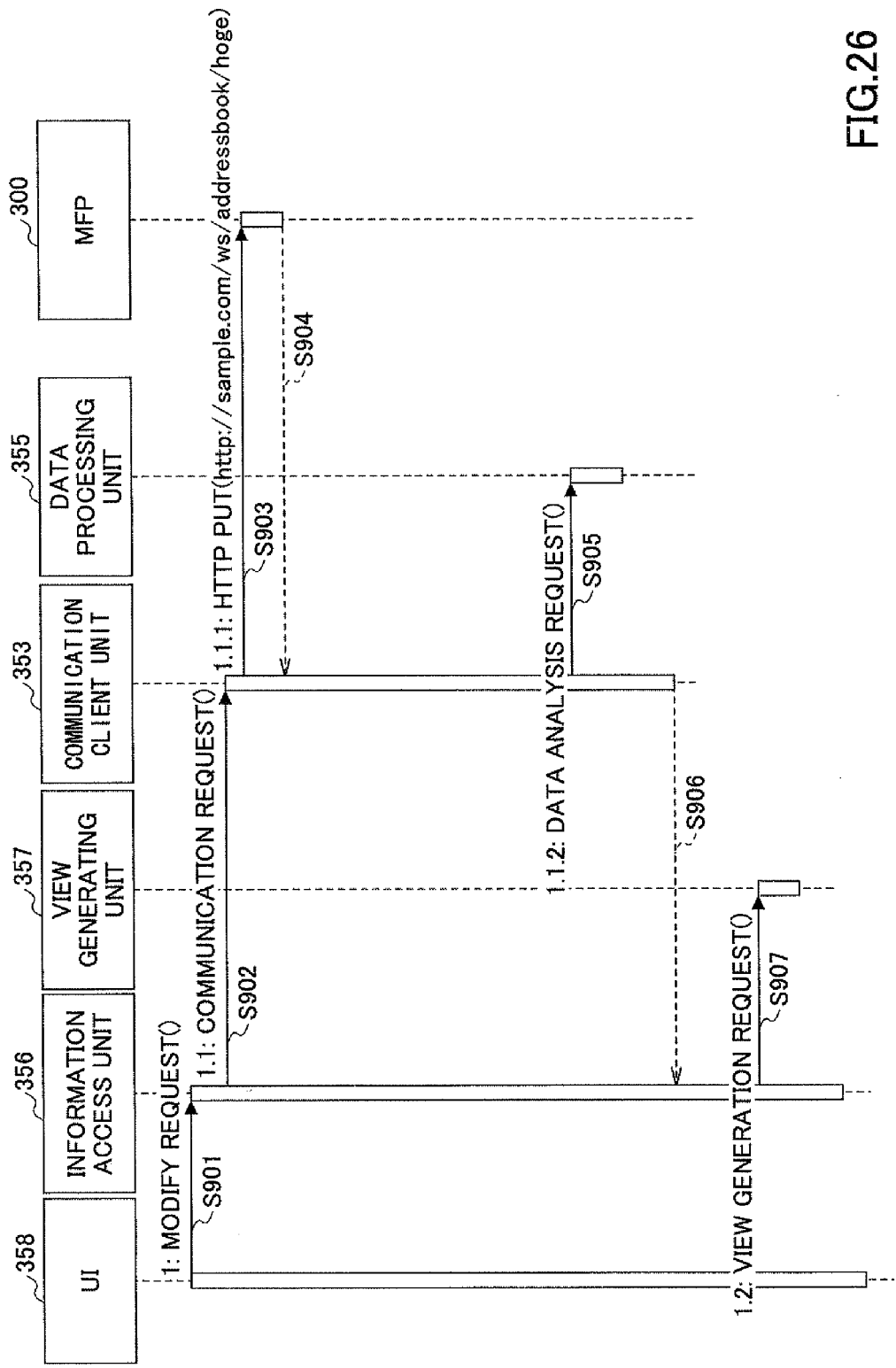
FIG. 26 is a sequence chart illustrating a process performed by a client PC to issue a request to modify an address book added to an MFP.

FIG. 26 is a sequence chart illustrating a process performed by a client PC to issue a request to modify an address book added to an MFP.

In step S901, the UI 358 supplies a user-indicated requested item requesting modification to the information access unit 356. In step S902 following step S901, the information access unit 356 issues to a communication client unit 353 a communication request that the user-indicated modification request be transmitted to the MFP 300.

In step S903 following step S902, the communication client unit 353 transmits the requested item as a request to the MFP 300. The request may be transmitted as an http request. In such a case, PUT(http://sample.com/ws/addressbook/hoge) of HTTP is sent to the MFP 300.

In step S904 following step S903, the MFP 300 transmits a response to the communication client unit 353 in response to the request. In step S905 following step S904, the communication client unit 353 requests the data processing unit 355 to analyze the response data.

As was previously described, the communication client unit 355 acquires a response item by analyzing the data of the received response described in the first description format.

In step S906 following step S905, the communication client unit 353 sends the analyzed response item to the information access unit 356. In step S907 following step S906, the information access unit 356 requests the view generating unit 357 to generate display screen data based on the response item.

Figure 27:
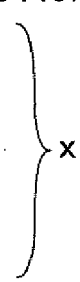
FIG. 27 is a drawing illustrating an example of a response obtained upon issuing a request to modify an address book.

FIG. 27 is a drawing illustrating an example of a response obtained upon issuing a request to modify an address book. Namely, the response as illustrated in FIG. 27 is transmitted from the MFP 300 in step S904.

In response to the analysis request issued in step S905, the data processing unit 355 analyzes the response illustrated in FIG. 27. The portion indicated by reference symbol "x" in FIG. 27 is extension data (new data) that is newly added at the MFP 300. The client PC thus does not recognize this data.

Figure 28:
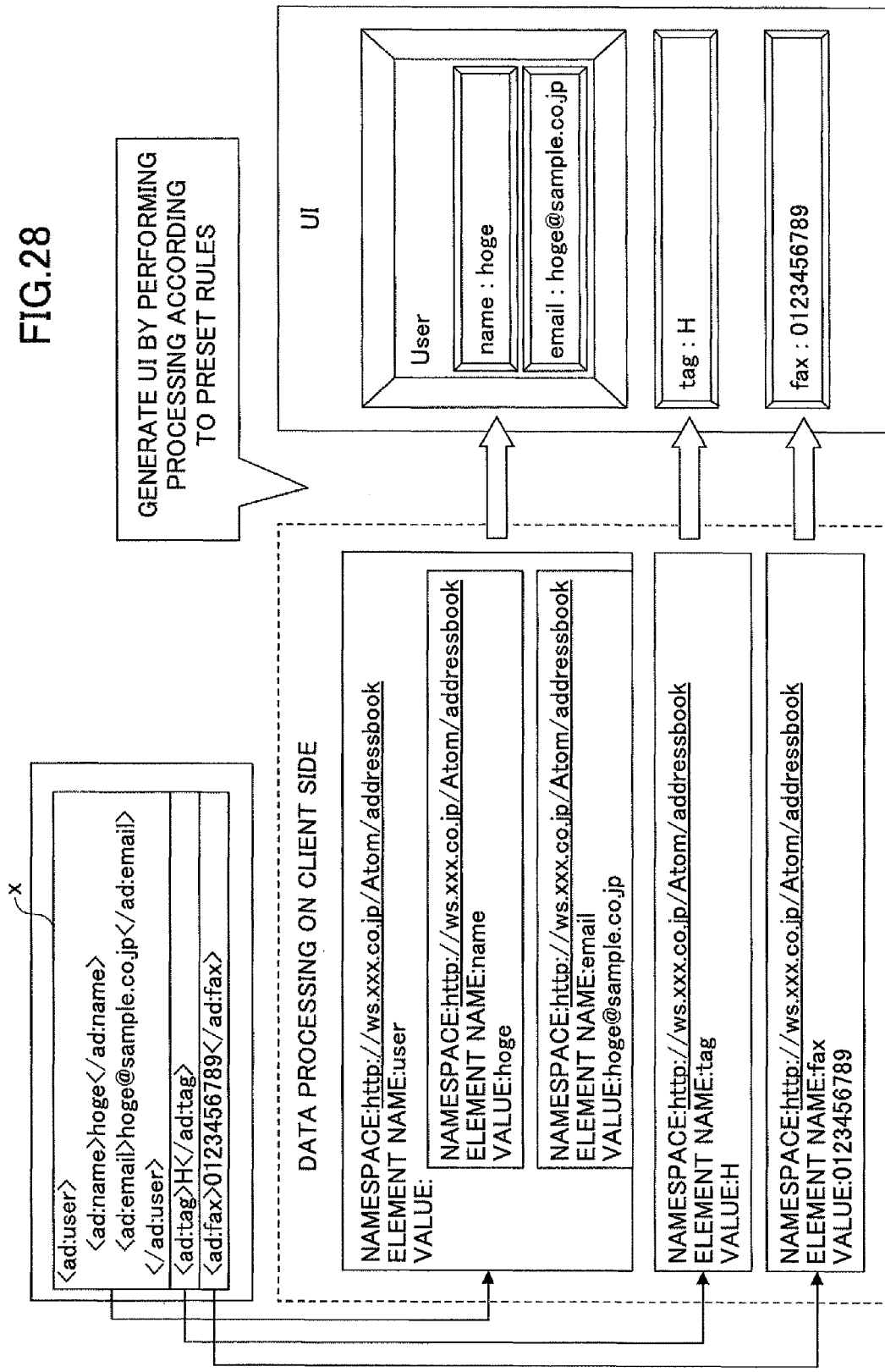
FIG. 28 is a drawing illustrating an example of generation of display screen data with respect to new data.

FIG. 28 is a drawing illustrating an example of generation of display screen data with respect to new data. In FIG. 28, the left hand side half illustrates data processing performed at the client PC. As illustrated in FIG. 28, the new data portion indicated by reference symbol "x" unknown to the client PC 350 is converted into a description format using a namespace, an element name, and a value, which can be processed by the client PC 350.

In response to the view generation request issued in step S907, the view generating unit 357 generates display screen data with respect to the acquired response items. In so doing, the new data indicated by reference symbol "x" as illustrated in FIG. 27 is converted as illustrated in FIG. 28. The client PC 350 can thus perform processing according to predetermined rules to display the new data on a display screen.

In FIG. 28, the right hand side half illustrates an example of the new data displayed on a display screen. As can be seen from comparison between FIG. 24 and FIG. 28, different display screen data are generated from the same data. The display screen as illustrated in FIG. 24 would appear in a straightforward configuration. In the client PC, however, display screen data is generated based on the new data according to the rules relating to generation of display screen data, thereby displaying the display screen as illustrated in FIG. 28.

In this manner, provision is made such that the client PC can generate display screen data according to predetermined rules even if the supplied data is unknown. The generation of display screen data is only an example. If processing can be performed without recognizing the contents of data, no modification is necessary on the client side to process the data.

In the present embodiment, all the data inclusive of parameters necessary for making device settings are described in a request or response so that only one exchange between a client PC and a server (MFP) suffices. Namely, only one exchange is sufficient to display screen data.

<Configuration of Computer>

FIG. 29 is a drawing illustrating the configuration of a computer implementing an MFP or a client PC according to the present embodiment. The computer of FIG. 29 includes a main processing unit 2800, an input device 2804, a display device 2805, a printer 2806, a scanner 2807, and an HDD 2808.

The main processing unit 2800 is a central portion for providing computing functions, and includes a CPU 2801, a RON 2802, and a RAM 2803. The CPU 2801 executes computer programs of the present embodiment by reading the computer programs from the ROM 2802 or the like to load the programs into the RAM 2803. The ROM 2802 is a nonvolatile memory, and stores computer programs performed by the CPU 2801 and parameters and the like necessary to control the MFP or client PC. The RAM 2803 serves as a work memory for use by the CPU 2801.

The input device 2804 may be a keyboard or the like, and is used by a user to enter instructions. The display device 2805 serves to display data indicative of status of the computer or the like. The printer 430 is an apparatus that forms an image on a medium. The scanner 2807 is an apparatus that optically scans an image formed on a medium. The HDD 2808 serves to store a large volume of data such as image data.

The computer programs of the present embodiment may be stored in the HDD 2808 or the ROM 2802, or may be stored in a recording medium that is mountable to a driver device that is not shown.

Further, the present invention is not limited to these embodiments, but various variations and modifications may be made without departing from the scope of the present invention. The object of the present invention may also be achieved by an image forming system that includes an MFP and a client PC connected to each other as illustrated in FIG. 4.

The present application is based on Japanese priority application No. 2008-177332 filed on Jul. 7, 2008, with the Japanese Patent Office, the entire contents of which are hereby incorporated by reference.

What is claimed is:

1. An image forming apparatus, comprising:
   a communication unit configured to receive a request written in a first description format;
   a data processing unit configured to convert a requested item contained in the request into a data format corresponding to the requested item if the image forming apparatus has the data format for processing the requested item, and configured to convert the requested item into a second description format if the image forming apparatus does not have the data format for processing the requested item;

a plurality of function implementing units for performing processes regarding image forming function, communication function, and facsimile function;

a management unit configured to store in memory a logic name and identification information identifying a function implementing unit for each of the plurality of function implementing units such that the logic name and the identification information are associated with each other; and a shared processing unit configured to define processes used in common by the plurality of function implementing units, wherein the management unit is configured to generate a logic unit of a function based on a logic name associated with given identification information contained in the request if the given identification information contained in the request is stored in the memory, the logic unit of the function serving to cause a function implementing unit identified by the given identification information to perform processing, wherein the shared processing unit is configured to request the logic unit generated by the management unit to process the requested item contained in the request, and wherein the management unit is configured to include, for the logic unit, only one or more processes needed by the function implementing unit identified by the given identification information among the processes defined by the shared processing unit.

2. The image forming apparatus as claimed in claim 1, wherein the management unit is configured to add a logic name and identification information identifying a new function implementing unit in the memory if the new function implementing unit is added to the image forming apparatus.

3. The image forming apparatus as claimed in claim 1, wherein the logic unit is configured to request the data processing unit to analyze data to be processed for the requested item if the data to be processed for the requested item is contained in the request.

4. The image forming apparatus as claimed in claim 1, further comprising:

a data format storage unit configured to store a response item data format corresponding to processing details on a function-implementing-unit-specific basis; and a response generating unit configured to acquire at least one of a response item provided in the response item data format and a response item provided in the second description format, and to generate a response in which the acquired one or more response items are described in the first description format, wherein the communication unit is configured to transmit the response to an external device that has issued the request.

5. An information processing method for an image forming apparatus which includes:

a communication unit configured to receive a request written in a first description format;

a data processing unit configured to convert a requested item contained in the request into a data format corresponding to the requested item if the image forming apparatus has the data format for processing the requested item, and configured to convert the requested item into a second description format if the image forming apparatus does not have the data format for processing the requested item;

a plurality of function implementing units for performing processes regarding image forming function, communication function, and facsimile function;

a management unit configured to store in memory a logic name and identification information identifying a function implementing unit for each of the plurality of function implementing units such that the logic name and the identification information are associated with each other; and a shared processing unit configured to define processes used in common by the plurality of function implementing units, said information processing method comprising:

checking, by the management unit, whether given identification information contained in the request for identifying a function implementing unit is found in the memory;

generating, by the management unit, a logic unit of a function based on a logic name associated with the given identification information if the given identification information is found in the memory by said checking, the logic unit of the function serving to cause the function implementing unit identified by the given identification information to perform processing; and requesting, by the shared processing unit, the logic unit generated by said generating to process the requested item contained in the request, wherein said generating generates the logic unit by including only one or more processes needed by the function implementing identified by the given identification information among the processes defined by the shared processing unit.

6. The information processing method as claimed in claim 5, further comprising adding, by the management unit, a logic name and identification information identifying a new function implementing unit in the memory if the new function implementing unit is added to the image forming apparatus.

7. The information processing method as claimed in claim 5, further comprising requesting, by the logic unit, the data processing unit to analyze data to be processed for the requested item if the data to be processed for the requested item is contained in the request.

8. The information processing method as claimed in claim 5, wherein the image forming apparatus further includes a data format storage unit configured to store a response item data format corresponding to processing details on a function-implementing-unit-specific basis, said information processing method further comprising:

acquiring, by a response generating unit, at least one of a response item provided in the response item data format and a response item provided in the second description format to generate a response in which the acquired one or more response items are described in the first description format; and transmitting, by the communication unit, the response to an external device that has issued the request.

9. An image forming system in which a client apparatus and an image forming apparatus are connected to each other, the client apparatus comprising:

a request generating unit configured to generate a request in a first description format, the request containing a requested item that is requested to the image forming apparatus; and a first communication unit configured to transmit the request, the image forming apparatus comprising:

a second communication unit configured to receive a request written in a first description format;

a data processing unit configured to convert a requested item contained in the request into a data format corresponding to the requested item if the image forming apparatus has the data format for processing the requested item, and configured to convert the requested item into a second description format if the image forming apparatus does not have the data format for processing the requested item;

a plurality of function implementing units for performing processes regarding image forming function, communication function, and facsimile function;

a management unit configured to store in memory a logic name and identification information identifying a function implementing unit for each of the plurality of function implementing units such that the logic name and the identification information are associated with each other; and a shared processing unit configured to define processes used in common by the plurality of function implementing units, wherein the management unit is configured to generate a logic unit of a function based on a logic name associated with given identification information contained in the request if the given identification information contained in the request is stored in the memory, the logic unit of the function serving to cause a function implementing unit identified by the given identification information to perform processing, wherein the shared processing unit is configured to request the logic unit generated by the management unit to process the requested item contained in the request, and wherein the management unit is configured to include, for the logic unit, only one or more processes needed by the function implementing unit identified by the given identification information among the processes defined by the shared processing unit.

10. The image forming system as claimed in claim 9, wherein the image forming apparatus further includes:

a data format storage unit configured to store a response item data format corresponding to processing details on a function-implementing-unit-specific basis; and a response generating unit configured to acquire at least one of a response item provided in the response item data format and a response item provided in the second description format, and to generate a response in which the acquired one or more response items are described in the first description format, wherein the second communication unit is configured to transmit the response to an external device that has issued the request.

11. The image forming system as claimed in claim 10, wherein the client apparatus further includes a display screen generating unit configured to generate display screen data based on a response received by the first communication unit, and the display screen generating unit generates display screen data according to display rules usable by the client apparatus with respect to response item data if the received response contains a response item described in the second description format.

* * * * *